US008070612B2

(12) United States Patent
Suzuki et al.

(10) Patent No.: US 8,070,612 B2
(45) Date of Patent: Dec. 6, 2011

(54) BOOT FOR CONSTANT-VELOCITY UNIVERSAL JOINT AND CROSS-GROOVED CONSTANT-VELOCITY UNIVERSAL JOINT

(75) Inventors: Satoshi Suzuki, Handa (JP); Kenji Oe, Chita (JP); Yuji Furuta, Nishikasugai-gun (JP); Satoshi Suzuki, Nishikasugai-gun (JP)

(73) Assignees: JTEKT Corporation, Osaka-shi (JP); Toyoda Gosei Co., Ltd., Nishikasugai-gun (JP)

( * ) Notice: Subject to any disclaimer, the term of this patent is extended or adjusted under 35 U.S.C. 154(b) by 298 days.

(21) Appl. No.: 12/444,427

(22) PCT Filed: Oct. 12, 2007

(86) PCT No.: PCT/JP2007/069924
§ 371 (c)(1),
(2), (4) Date: Apr. 6, 2009

(87) PCT Pub. No.: WO2008/044760
PCT Pub. Date: Apr. 17, 2008

(65) Prior Publication Data
US 2010/0120546 A1 May 13, 2010

(30) Foreign Application Priority Data

Oct. 12, 2006 (JP) .................. 2006-278768
Nov. 27, 2006 (JP) .................. 2006-318762

(51) Int. Cl.
*F16D 3/227* (2006.01)
*F16D 3/84* (2006.01)
(52) U.S. Cl. ....................... 464/175; 464/906
(58) Field of Classification Search .................. 464/144, 464/175, 173, 906; 428/36.9; 403/51, 50; 277/634–636, 391; 74/18–18.2
See application file for complete search history.

(56) References Cited

U.S. PATENT DOCUMENTS 3,396,554 A * 8/1968 Westercamp .................. 464/143
4,325,232 A * 4/1982 Girguis .......................... 464/144
(Continued)

FOREIGN PATENT DOCUMENTS

EP         157559 A  * 10/1985
(Continued)

*Primary Examiner* — Gregory Binda
*Assistant Examiner* — Matthieu Setliff
(74) *Attorney, Agent, or Firm* — Oblon, Spivak, McClelland, Maier & Neustadt, L.L.P.

(57) ABSTRACT

A boot for constant-velocity universal joint comprises a major-diameter cylindrical portion 2, a minor-diameter cylindrical portion 3 being separated away from and being put in place concentrically with the major-diameter cylinder portion 2, and having a smaller diameter than that of the major-diameter cylindrical portion 2, and an intermediate portion 10 connecting the major-diameter cylindrical portion 2 with the minor-diameter cylindrical portion 3. The intermediate portion 10 comprises a stretchable bellows portion 19 being connected with the minor-diameter cylindrical portion 3 integrally, and a rigidity-producing portion 11 being connected with the bellows portion 19 and the major-diameter cylindrical portion 2 integrally. The rigidity-producing portion 11 enlarges diametrically from the bellows portion 19 toward the major-diameter cylindrical portion 2, and additionally at least an outer peripheral surface 101 of the rigidity-producing portion 11 has a plurality of shoulders 61 in a stepwise manner. By means of the rigidity-producing portion 11, the rigidity at around the major-diameter cylindrical portion is enhanced, and thereby it is possible to suppress deformation at the time of assembling.

10 Claims, 11 Drawing Sheets

U.S. PATENT DOCUMENTS

| | | | |
|---|---|---|---|
| 5,311,912 A | | 5/1994 | Hayward |
| 5,632,683 A | * | 5/1997 | Fukumura et al. ............ 464/144 |
| 5,779,551 A | * | 7/1998 | Stall et al. .................... 464/111 |
| 5,879,238 A | | 3/1999 | Breheret |
| 6,171,196 B1 | * | 1/2001 | Welschof ...................... 464/146 |
| 6,227,979 B1 | * | 5/2001 | Yamamoto et al. ........... 464/145 |
| 6,280,338 B1 | * | 8/2001 | Hayama et al. ............... 464/146 |
| 6,332,844 B1 | * | 12/2001 | Hayama et al. ............... 464/145 |
| 6,530,843 B2 | * | 3/2003 | Miller et al. .................. 464/145 |
| 2005/0236779 A1 | * | 10/2005 | You ............................... 277/636 |

FOREIGN PATENT DOCUMENTS

| | | |
|---|---|---|
| FR | 2686671 A1 * | 7/1993 |
| JP | 1 69916 | 5/1989 |
| JP | 6 32755 | 4/1994 |
| JP | 9 177816 | 7/1997 |
| JP | 10 508928 | 9/1998 |
| JP | 2004 60848 | 2/2004 |
| JP | 2007 154908 | 6/2007 |

* cited by examiner

BOOT FOR CONSTANT-VELOCITY UNIVERSAL JOINT AND CROSS-GROOVED CONSTANT-VELOCITY UNIVERSAL JOINT

TECHNICAL FIELD

The present invention relates to a boot for constant-velocity universal joint, boot which covers constant-velocity universal joint that is used in the drive shaft of vehicle, and the like; and it relates to a cross-grooved constant-velocity universal joint in which a ball locus in outer-race ball grooves and a ball locus in inner-race ball grooves are formed so as to cross one another peripherally.

BACKGROUND ART

In the power transmission apparatus of vehicle, and the like, driving force is transmitted to driving wheels from a transmission by way of a drive shaft that comprises a shaft and a constant-velocity universal joint. As illustrated in FIG. 10, the drive shaft has a shaft 83, and joints 41, 42 that are placed at the axial opposite ends of the shaft 83. One of them, the joint 41, is connected with a driving member, such as a differential device, on the inboard side; and the other one of them, the joint 42, is connected with a driven member, such as a driving wheel, on the outboard side.

The joints 41, 42 are a ball type, for instance. The joints 41, 42 comprise an inner race 8 in which a plurality of ball grooves 81 are formed at equal intervals in the peripheral direction, balls 80 which roll within the ball grooves 81, and an outer race 7 which accommodates the ball grooves 81 of the inner race 8 and the balls 80 in the cupped portion 70. The inboard-side joint 41 transmits rotary torque at constant velocity from the input-side outer race 7 to the output-side inner race 8 by way of the rollable balls 80. The outboard-side constant-velocity universal joint 42 transmits rotary torque at constant velocity from the input-side inner race 8 to the output-side outer race 7 by way of the rollable balls 80. Both of the constant-velocity universal joints 41, 42 are covered by means of a bellows-structured boot 1 in which grease is sealed so that the intrusion of foreign materials is prevented, and thereby their smooth rotations at large angles are maintained.

This boot 1 for constant-velocity universal joint has a major-diameter cylindrical portion 2 being retained to the outer race 7, a minor-diameter cylindrical portion 3 having a smaller diameter than that of the major-diameter cylindrical portion 2 and being retained to the shaft 83, and a substantially-truncated-cone-configured stretchable bellows portion 19 connecting the major-diameter cylindrical portion 2 with the minor-diameter cylindrical portion 3 integrally. At the time of service, the bellows portion 19 deforms in compliance with angles (joint angles) that the outer race 7 and the shaft 83 make. Accordingly, the boots 1 seal the joints 41, 42 securely by means of the deformation of the bellows portion 19, even when the joint angle becomes larger.

In order to assemble a drive shaft, first of all, the balls 80 are put in place in the ball groves 81 of the inner races 8 that are fixed to the both axial opposite ends of the shaft 83. Next, the inner races 8 are fitted into the inside of the cupped portion 70 of the outer races 7. Then, the minor-diameter cylindrical portion 3 of the boots 1 is fixed to the shaft 83 with a clamp 30. Moreover, the major-diameter cylindrical portion 2 of the boots 1 is fixed to the cupped portion 70 of the outer races 7 with a clamp 20.

Upon assembling the drive shaft with a vehicle, the shaft 83 is gripped at around the middle with a hand 85, and is then raised, as illustrated in FIG. 15. Around the inner races 8 that are fixed at both axial opposite ends of the shaft 83, the outer races 7 are placed by way of the rotatable balls 80. Accordingly, when the shaft 83 as raised, the outer races 7 with predetermined weight hang downward from both opposite ends of the shaft 83. On this occasion, the bellows portion 19 of the boots 1 deforms diametrically, and thereby the boots 1 might have interfered with the balls 80 inside the cupped portion 70 of the outer races 7. Sometimes, the boots 1 might not be provided with rigidity to such an extent that they can limit the movements of the balls 80, and thereby the balls 80 might have come off from the outer races 7, as shown in FIG. 16. In order to assemble the balls 80 inside the outer races 7, the boots 1 are removed from the joints 41, 42. Next, the joints 41, 42 are disassembled. Thereafter, the inner races 8 are assembled again with the balls 80 and outer races 7 to constitute the joints 41, 42, thereby fixing the boots 1 onto the joints 41, 42. Thus, when the balls 80 come off from the outer races 7, it is needed to carry out the disassembly/assembly of the joints 41, 42 again, and it is troublesome. It is believed that the balls 80 come off from the outer races 7 because the part of the bellows portion 19 of the boots 1, part which is close to the major-diameter cylindrical portion 2, has a bellows configuration so that the rigidity is weak and accordingly it is likely to deform.

Moreover, as an example of ball-type constant-velocity universal joint, cross-grooved constant-velocity universal joints are available. In cross-grooved constant-velocity universal joint, the ball locus in the outer-race ball grooves and the ball locus in the inner-race ball grooves cross one another peripherally. In such a cross-grooved constant-velocity universal joint, it as needed to prevent the balls, which constitute the constant-velocity universal joint, from coming off from the outer races in the course of assembly, in the course of conveyance after assembly and before being installed to a vehicle and the like, and so forth.

As one of the measures for this, for example, in FIG. 2 of Japanese Unexamined Utility Model Publication (KOKAI) Gazette No. 1-69, 916, the following are set forth: a metallic fitting is put in place on the opening side of the outer races, thereby limiting the joint angle by means of bringing the shaft into contact with the aforesaid metallic fitting; as a consequence it is adapted so that the balls do not come off from the outer races. Moreover, in FIG. 1 of aforesaid Japanese Unexamined Utility Model Publication (KOKAI) Gazette No. 1-69, 916, instead of the aforementioned metallic fitting, using boots that have rigidity being equal to that of the aforesaid metallic fitting is set forth. In addition to these, in Japanese Unexamined Utility Model Publication (KOKAI) Gazette No. 6-32, 755, the following are set forth: a circlip is put in place on the inner peripheral surface of the opening end of the outer races, thereby limiting the joint angle by means of bringing the balls into contact with the circlip; as a consequence it is adapted so that the balls do not come off from the outer races.

DISCLOSURE OF THE INVENTION

Assignment to be Solved by the Invention

However, in the case of using boots that have rigidity being equal to that of the metallic fitting (FIG. 1 of Japanese Unexamined Utility Model Publication (KOKAI) Gazette No. 1-69, 916), the axial length should be secured sufficiently in addition to the wall thickness in order to secure high rigidity for the aforesaid boots. By means of thus making the wall thickness thicker and the axial length longer, the volume of elastomer for forming the boots enlarges. Therefore, it brings about making the boots high cost. Further, by means of the fact that the axial length of the boots enlarges, the boots themselves jumboize; as a result, the grease to be filled within them becomes necessary in a large amount. Moreover, in the technique according to Japanese Unexamined Utility Model Publication (KOKAI) Gazette No. 1-69, 916, the rigid cylindrical portion has a cylindrical configuration. There has been such a desire that one would like to enhance the rigidity further by devising the configuration of such a rigid cylindrical portion and consequently to enhance the rigidity at around the major-diameter cylindrical portion furthermore, thereby suppressing the coming off of the balls that results from the deformed boots. Moreover, in the case of using another component part, such as the metallic fitting and circlip (FIG. 2 of Japanese Unexamined Utility Model Publication (KOKAI) Gazette No. 1-69, 916, and Japanese Unexamined Utility Model Publication (KOKAI) Gazette No. 6-32, 755), it brings about turning them into high-cost ones by means of the increase in the number of component-part quantities and the increase in the number of man-hour requirements for assembly.

The present invention is one which has been done in view of such circumstances, and it is an object to provide a boot for constant-velocity universal joint and a cross-grooved constant-velocity universal joint that can prevent the balls from coming off from the outer races; especially, it is an object to provide a boot for constant-velocity universal joint, boot which can suppress deformation at the time of assembly by enhancing the rigidity at around the major-diameter cylindrical portion, and a cross-grooved constant-velocity universal joint that can prevent the balls from coming off from the outer races without ever using any new component part, and while suppressing the enlargement of the wall thickness and axial length of the boots.

Means for Solving the Assignment (1) A boot for constant-velocity universal joint according to the present invention comprises: a major-diameter cylindrical portion; a minor-diameter cylindrical portion being separated away from and being put in place concentrically with the major-diameter cylindrical portion, and having a smaller diameter than that of the major-diameter cylindrical portion; and an intermediate portion connecting the major-diameter cylindrical portion with the minor-diameter cylindrical portion. The intermediate portion comprises: a stretchable bellows portion being connected with the minor-diameter cylindrical portion integrally; and a rigidity-producing port ion being connected with the bellows portion and the major-diameter cylindrical portion integrally. The rigidity-producing portion enlarges diametrically from the bellows portion toward the major-diameter cylindrical portion, and additionally at least an outer peripheral surface of the rigidity-producing portion has a plurality of shoulders in a stepwise manner.

In accordance with the aforementioned construction, the rigidity-producing portion exhibits a diameter that enlarges from the bellows portion toward the major-diameter cylindrical portion, and additionally at least an outer peripheral surface of the rigidity-producing portion has a plurality of shoulders in a stepwise manner. The rigidity-producing portion with a plurality of shoulders being formed in a stepwise manner exhibits rigidity higher than that of rigidity-producing portion with cylindrical configuration. Accordingly, it is possible to enhance rigidity at around the major-diameter cylindrical portion. That is, by means of turning the vicinity of the major-diameter cylindrical portion into the rigidity-producing portion possessing a plurality of stepwise shoulders, the rigidity at around the major-diameter cylindrical portion enhances, compared with the case of forming the same part as that of the rigidity-producing portion as a cylindrical shape, a cup shape or a bellows shape in a boot with identical size. Because of this, even when the resultant universal joint is raised, it is possible to keep the boot from deforming downward due to the weight of outer race, and thereby it is possible to keep balls from coming off from the outer race.

(2) A cross-grooved constant-velocity universal joint according to the present invention is a cross-grooved constant-velocity universal joint that is provided with said boot. This cross-grooved constant-velocity universal joint is provided with: an outer race comprising a cup shape, the outer race with a plurality of outer-race ball grooves being formed in the inner peripheral surface, outer-race ball grooves which twist with respect to an outer-race rotary shaft and one of whose opposite ends is opened to the opening end; an inner race being put in place on the inner side of said outer race slidably in the direction of said outer-race rotary shaft with respect to said outer race, the inner race with a plurality of inner-race ball grooves being formed in the outer peripheral surface and in a direction twisting with respect to an inner-race rotary shaft; a plurality of balls locking peripherally with respect to said outer-race ball grooves and said inner-race ball grooves so as to be put in place rollably, and being put in place at intersections between said outer-race ball grooves and said inner-race ball grooves that cross with respect to said outer-race ball grooves; and a retainer being put in place between said outer race and said inner race, the retainer with a plurality of windows being formed, windows into which said balls are inserted respectively. Said boot is a flexible boot, which covers and caps between the opening end of said outer race and a shaft that is inserted into said inner race coaxially therewith. Said major-diameter cylindrical portion of said boot is fixed by fastening onto the outer peripheral surface of the opening end of said outer race. Said minor-diameter cylindrical portion of said boot is fixed by fastening onto said shaft.

In accordance with said construction, the boot exhibits a diameter that enlarges from the bellows portion toward the major-diameter cylindrical portion, and additionally possesses the rigidity-producing portion that has a plurality of shoulders in a stepwise manner on at least an outer peripheral surface of the rigidity-producing portion. Accordingly, it is possible to enhance rigidity at around the major-diameter cylindrical portion. Therefore, even when the resultant universal joint is raised, it is possible to keep the boot from deforming downward due to the weight of the outer race, and thereby it is possible to keep the balls from coming off from the outer race.

Effect of the Invention

In accordance with the boot for constant-velocity universal joint according to the present invention, since the rigidity-producing portion with a plurality of the shoulders, which are formed in a stepwise manner on the outer peripheral surface at least, is disposed in the vicinity of the major-diameter cylindrical portion, the rigidity at around the major-diameter cylindrical portion enhances. Hence, it is possible to suppress deformation at the time of assembly, and thereby it is possible to prevent the balls from coming off from the outer race.

In accordance with the cross-grooved constant-velocity universal joint according to the present invention, since it is provided with the boot that possesses said rigidity-producing portion in the vicinity of the major-diameter cylindrical portion, the rigidity at around the major-diameter cylindrical portion enhances. Hence, it is possible to suppress deformation at the time of assembly, and thereby it is possible to prevent the balls from coming off from the outer race.

Figure 1:
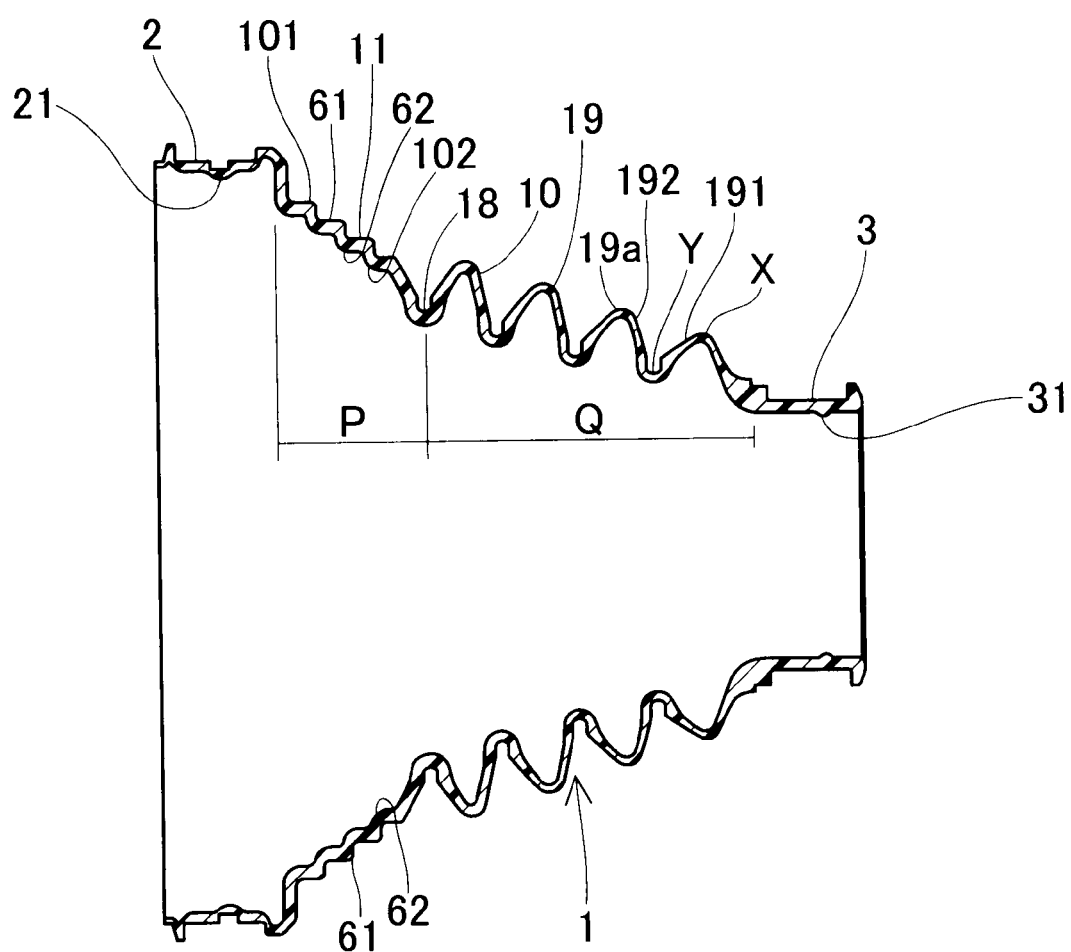
FIG. 1 is a cross-sectional diagram of a boot for constant-velocity universal joint that is directed to Embodiment No. 1.

BEST MODE FOR CARRYING OUT THE INVENTION (Boot for Constant-Velocity Universal Joint)

The rigidity-producing portion in the vicinity of the major-diameter cylindrical portion in the boot for constant-velocity universal joint enlarges diametrically from the bellows portion toward the major-diameter cylindrical portion. At least an outer peripheral surface of the rigidity-producing portion has a plurality of the shoulders in a stepwise manner.

The shoulders possess a crest protruding diametrically outward, and a root denting diametrically inward; and the crests and roots are repeated alternately. And, the shoulders have a side surface that connects between the root and the crest substantially axially, and an end surface that connects between the crest and the root substantially diametrically. It is preferable that the side surface of the shoulders can be parallel to the axial direction of the shoulders. In this case, the rigidity-producing portion can demonstrate excellent rigidity. Moreover, it is allowable that the side surface of the shoulders can incline as a tapered shape with respect to the axial direction of the shoulders. In this case as well, it is possible to demonstrate rigidity to such an extent that can withstand the weight of outer race at the time of raising joint. It is preferable that the end surface of the shoulders can be parallel to the diametrical direction of the shoulders. In this case, the rigidity-producing portion can demonstrate excellent rigidity. Moreover, it is allowable that the end surface of the shoulders can incline as a tapered shape with respect to the diametrical direction of the shoulders. In this case as well, it is possible to demonstrate rigidity to such an extent that can withstand the weight of outer race at the time of raising joint.

In a plurality of the stepwise shoulders, it is allowable to be at least one of the following: the side surfaces can be parallel to the axial direction of the shoulders; and the end surfaces can be parallel to the diametrical direction of the shoulders. Preferably, at least the end surfaces can be parallel to the diametrical direction of the shoulders. Furthermore, it is desirable that the side surfaces can be parallel to the axial direction of the shoulders, and that the end surfaces can be parallel to the diametrical direction of the shoulders.

Note that the "axial direction of the shoulders" is the axial direction of the shoulders in the boot that is in a state before being assembled with joint. That is, it means the axial direction of rigid cylindrical portion in the case where the rigidity-producing portion does not undergo any deformation, concretely speaking, in the case where the major-diameter cylindrical portion and the minor-diameter cylindrical portion are positioned coaxially. Moreover, the "diametrical direction of the shoulders" is the diametrical direction of the shoulders in the boot that is in a state before being assembled with joint; namely it means the diametrical direction of rigid cylindrical portion in the case where the rigidity-producing portion does not undergo any deformation, and in the case where the major-diameter cylindrical portion and the minor-diameter cylindrical portion are positioned coaxially.

Figure 3A:
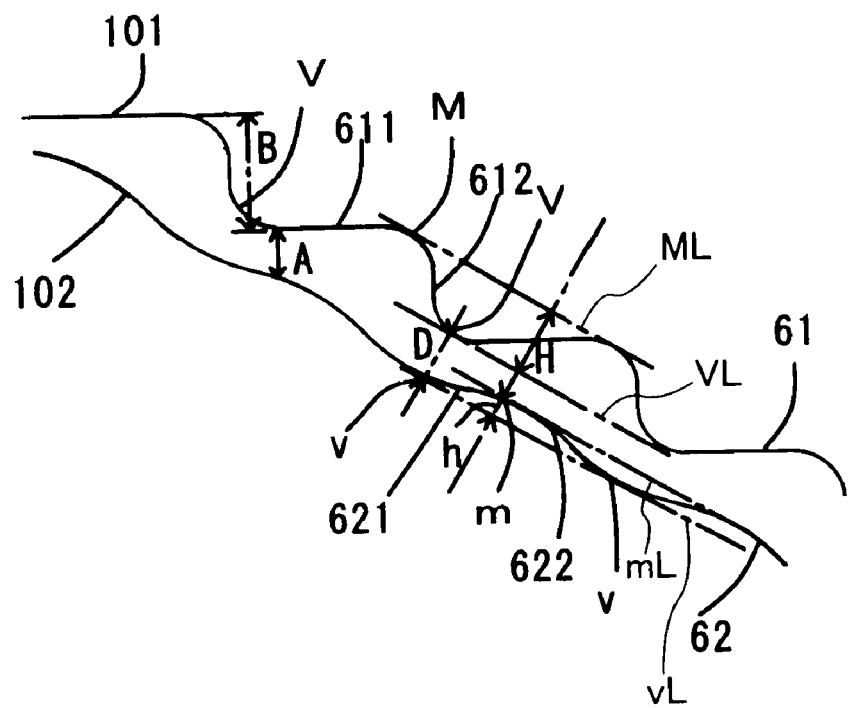
FIG. 3(a) is a cross-sectional explanatory diagram of a rigidity-producing portion that is directed to Embodiment No. 1.

Although the shoulders are formed on the outer peripheral surface of the rigidity-producing portion at least, it is allowable that shoulders, which are similar to the shoulders on the outer peripheral surface, can be formed on the inner peripheral surface. It is preferable that the inner peripheral surface of the rigidity-producing portion can possess shoulders whose level difference is smaller than that of the shoulders that are formed on the outer peripheral surface. Specifically, it is preferable that the level difference of the shoulders that are formed on the inner peripheral surface of the rigidity-producing portion can be smaller than the level difference of the shoulders that are formed on the outer peripheral surface. The "level difference of the shoulders" refers to a distance between the crests of the shoulders and the roots. That is, in the case of an outer peripheral surface 101 of a rigidity-producing portion, the level difference refers to a distance between the root tangent "VL" that connects between the neighboring roots "V" and the crest tangent "ML" that connects between the neighboring crests "M," as shown in FIG. 3(a). In the case of an inner peripheral surface 102 of a rigidity-producing portion, the level difference refers to a distance between the root tangent "vL" that connects between the neighboring roots "v" and the crest tangent "mL" that connects between the neighboring crests "m." In other words, a rigidity-producing portion 11 has parts that are formed thicker than a wall thickness "d" of a bellows portion 19 (the wall thickness of a rightward-rising slope 19) or leftward-rising slope 192). The parts of the rigidity-producing portion 11 whose wall thickness is thicker are at around the crests "m" of the inner peripheral surface 102. In the case where the level difference of shoulders that are formed on the inner peripheral surface of a rigidity-producing portion is thus smaller than the level difference of shoulders that are formed on the outer peripheral surface of the rigidity-producing portion, the thickness (wall thickness) between the vicinity of the crests of the shoulders on the outer peripheral surface and the inner peripheral surface becomes thick, compared with the case where the level differences are the same. That is, the diametrical thickness between the side surfaces and the inner peripheral surface becomes greater at around the crests "M" of the shoulders on the outer peripheral surface; and moreover, the axial thickness between the end surfaces and the inner peripheral surface becomes greater at around the crests "M" of the shoulders on the outer peripheral surface. Consequently, the rigidity of the resulting rigidity-producing portion upgrades furthermore.

On the inner peripheral surface of a rigidity-producing portion, it is even allowable that no shoulders can be formed. In this case, the inner peripheral surface of the rigidity-producing portion enlarges diametrically in a linear manner from the bellows portion to the major-diameter cylindrical portion. Accordingly, the diametrical thickness between the side surfaces and the inner peripheral surface becomes large at around the crests "M" of the shoulders on the outer peripheral surface, compared with the case where shoulders are formed on the inner peripheral surface. Moreover, the axial thickness between the end surfaces and the inner peripheral surface becomes large at around the crests "M" of the shoulders on the outer peripheral surface, compared with the case where shoulders are formed on the inner peripheral surface. Consequently, the rigidity of the resulting rigidity-producing portion upgrades furthermore.

It is preferable that a length of at least one of the side surfaces and end surfaces of the shoulders on the outer peripheral surface of the rigidity-producing portion can be smaller than a length of at least one of the leftward-rising slope and rightward-rising slope between the crests and roots on the outer peripheral surface of the bellows portion. Thus, the rigidity of the resulting rigidity-producing portion enhances more effectively.

It is allowable that a ratio (B/A), a ratio of a diametrical length (B) of the end surface of the shoulders with respect to a diametrical thickness (A) of the side surface thereof, can rather be small; and it is preferable that the "B/A" can be 0.5-2.0. In the case of being less than 0.5, the diametrical thickness (A) of the side surface becomes too long with respect to a summed value of the diametrical thickness (A) of the side surface and the diametrical length (B) of the end surface so that the rigidity-producing portion turns into a configuration that can be approximated to a cylindrical configuration, and thereby there is such a fear that it might become likely to be folded or bent (See Comparative Example No. 2). In the case of exceeding 2.0, the length (B) of the end surface becomes too long with respect to a summed value of the diametrical thickness (A) of the side surface and the diametrical length (B) of the end surface so that flexure might arise on the end surface by means of stress concentration to result in deformation of the rigidity-producing portion as a whole.

It is allowable that a step number of the shoulders can be 2 or more, and it is preferable that the upper limit can be 5. Even if the step number is too much, no effectual improvement that is capable of meeting it can be expected.

It is preferable that a ratio (P/Q), a ratio of an axial length (P) of the rigidity-producing portion with respect to an axial length (Q) of the bellows portion, can be 0.3-2.0. In the case of being less than 0.3, the axial length (P) of the rigidity-producing portion becomes too short with respect to a summed length of the axial length (Q) of the bellows portion and the axial length (P) of the rigidity-producing portion, and thereby there is such a fear that the vicinity at around the major-diameter cylindrical portion might become likely to bend. In the case of exceeding 2.0, the axial length (Q) of the bellows portion becomes too short with respect to a summed length of the axial length (Q) of the bellows portion and the axial length (P) of the rigidity-producing portion, and thereby there is such a fear that the stretchability of the resulting boot might degrade.

It is preferable that a wall thickness of the rigidity-producing portion can be the same as or more than a wall thickness of the bellows portion. Further, it is allowable that the wall thickness of the rigidity-producing portion can be greater than the wall thickness of the bellows portion. In this case, the rigidity of the rigidity-producing portion upgrades furthermore.

Moreover, in a connect or portion with the rigidity-producing portion at the bellows portion, it is preferable that a dent can be formed, dent which dents diametrically inward and whose axially cross section is a letter-"U" grooved configuration. When external force is applied to the boot, the bellows portion becomes likely to undergo compression/stretching by means of the dent with a letter-"U" configuration, and thereby it is possible to suppress deformation of the rigidity-producing portion furthermore effectively.

The boot comprises synthetic resin; for example, it can be molded by a heretofore known method, such as blow molding or injection molding, using thermoplastic elastomeric resin, such as TPE (polyester thermoplastic elastomer) or TPO (polyolefin thermoplastic elastomer), or using rubber.

(Cross-Grooved Constant-Velocity Universal Joint)

A cross-grooved constant-velocity universal joint according to the present invention possesses said boot for constant-velocity universal joint. The aforesaid boot covers and caps between the opening end of an outer race and a shaft. The major-diameter cylindrical portion of the boot is fixed by fastening onto the opening-end outer peripheral surface of the outer race, and the minor-diameter cylindrical portion of the boot is fixed by fastening onto the shaft. The rigidity-producing portion of the aforesaid boot enlarges diametrically from the bellows portion toward the major-diameter cylindrical portion, and additionally at least an outer peripheral surface of the rigidity-producing port ion possesses a plurality of the shoulders that enlarge diametrically toward the major-diameter cylindrical portion.

Here, it is preferable that said balls can lock with respect to said outer-race ball grooves peripherally, and can come in contact with the inner peripheral surface of said rigidity-producing portion of said boot, when the central axis of said outer race and the central axis of said shaft have taken an angle of a predetermined value or more.

In the course of assembling the cross-grooved constant-velocity universal joint, and in the course of conveyance after the assembly and before being installed to a vehicle and the like, the central axis of the outer race and the central axis of the shaft can move freely, and thereby the inclination angle (joint angle) between both central axes might have been made large excessively by means of external force. In this instance, there arises the case where the inclination angle between both central axes might become an angle of the maximum angle, which occurs at the time of torque transmission byway of the balls, or more, namely, the angle of a predetermined value or more. On this occasion, some of the multiple balls try to move in such a direction that they separate away from one of the opposite ends of the outer-race ball grooves. However, the movement of the balls is controlled because of the fact that the balls, which try to separate away from the outer-race ball grooves, come in contact with the inner peripheral surface of the rigidity-producing portion of the boot. In other words, the balls do not separate away from the outer-race balls grooves by means of the rigidity-producing portion of the boot. Therefore, in accordance with the present invention, it is possible to prevent the balls from coming off from the outer race.

By the way, the rigidity-producing portion of the boot is formed so that it is connected integrally with a side of the major-diameter cylindrical portion that is closer to the minor-diameter cylindrical portion, and so that it reduces diametrically toward the minor-diameter cylindrical portion. And, the aforesaid rigidity-producing portion is put in place at a position at which the balls that try to separate away from the outer-race grooves are capable of coming in contact with it. In other words, the major-diameter side of the aforesaid rigidity-producing portion is positioned at around the opening-end outer peripheral surface of the outer race, and the minor-diameter side of the aforesaid rigidity-producing portion is positioned outward beyond the outer-race balls grooves in the direction of the outer-race rotary axis of the outer race. To put it differently, the rigidity-producing portion is put in place so as to cover and cap at least the diametrically outer side of the outer-race ball grooves. By thus putting it in place, the balls are brought into contact with the inner peripheral surface of the rigidity-producing portion securely, and thereby it is possible to control the movement of the balls.

Moreover, the rigidity-producing portion controls the movement of the balls by means of being put in place so as to cover and cap the outer-race ball grooves, as described above. On the contrary, a boot, which has a rigid cylindrical portion (33) in a manner like FIG. 1 of Japanese Unexamined Utility Model Publication (KOKAI) Gazette No. 1-69, 916, controls the joint angle by means of bringing a shaft into contact with an opposite end of the rigid cylindrical portion of the aforesaid boot. Therefore, it is not needed to make an axial length of the rigidity-producing portion in the present invention long so much, and accordingly it is possible to make an axial length of the rigidity-producing portion short compared with that of the rigid cylindrical portion in FIG. 1 of Japanese Unexamined Utility Model Publication (KOKAI) Gazette No. 1-69, 916. Hence, compared with those having been known heretofore, it is possible to suppress the enlargement of the boot's axial length. Moreover, it is also allowable that the rigidity of the rigidity-producing portion in the present invention can be low compared with the rigidity of the aforesaid part in Japanese Unexamined Utility Model Publication (KOKAI) Gazette No. 1-69, 916. It is because of the following: when extracting only a part that corresponds to the rigid cylindrical portion in Japanese Unexamined Utility Model Publication (KOKAI) Gazette No. 1-69, 916 to observe, it is a cantilever beam with a long axial length, and receives load from the shaft at its end; whereas the rigidity-producing portion in the present invention is a cantilever beam with a short axial length, and receives load from the balls at its central region; and consequently, suppose if load that the boots receive is identical one another, the flexural magnitude of the rigidity-producing portion in the present invention becomes small compared with the flexural magnitude of the aforesaid part in Japanese Unexamined Utility Model Publication (KOKAI) Gazette No. 1-69, 916. In other words, the rigidity-producing portion in the present invention can suppress the enlargement of wall thickness compared with those having been known heretofore.

Further, in the present invention, the balls are prevented from coming off from the outer race by means of the boot alone. In other words, the present invention does not use any new component part, such as metallic fitting and circlip like those having been known heretofore. Thus, the present invention can prevent the balls from coming off from the outer race, without ever using any new component part, and while suppressing the enlargement of the wall thickness and axial length of the boot.

It is allowable that a tangent plane of the balls at the aforesaid coming-in-contact position, and an extension line of the bottom of the inner-race ball grooves can cross one another more outward to said outer race beyond the opening end of the outer race, in the course of the balls coming in contact with the inner peripheral surface of the rigidity-producing portion of the boot. In other words, it is possible to demonstrate a wedge effect by means of the rigidity-producing portion of the boot and the inner-raceball grooves. Therefore, it is possible to securely keep the balls from moving outward to the outer race by means of this wedge effect.

It is allowable that the tangent plane of said balls at the coming-in-contact position can especially be a tangent plane that is at the furthermost position away from the cupped bottom of the outer race, furthermost position which is one of the coming-in-contact positions of the balls. Thus, it is possible to demonstrate the wedge effect securely.

It is preferable that said inner peripheral surface of the rigidity-producing portion can be a tapered shape, which enlarges diametrically toward said major-diameter cylindrical portion. Specifically, it is allowable that the rigidity-producing portion of the boot can be made so that the outer peripheral surface is formed as a stepwise shape with a plurality of shoulders and the inner peripheral surface is formed as a tapered configuration. In this case, the rigidity-producing portion is less likely to deform, compared with the case where a part, which is identical to the rigidity-producing portion, in boot with an identical size is formed as a bellows shape or cylindrical shape with an identical volume. Moreover, even if it deforms, the deforming magnitude is less. Consequently, the balls are less likely to move so that they are less likely to interfere with the boot. Even if the boot deforms so that the balls have moved, it is possible to keep the balls from moving outward beyond their tangent planes by bringing the balls into contact with the inner peripheral surface of the rigidity-producing portion.

Moreover, the tapered shape of the inner peripheral surface of the rigidity-producing portion includes linear shapes, curved shapes, and stepped shapes. Among these, it is allowable that the tapered configuration of said inner peripheral surface of said rigidity-producing portion can be a linearly-tapered shape. Thus, it is possible to let the tangent plane of the balls at the coming-in-contact position with respect to the rigidity-producing portion, and the extension line of the bottom of the inner-race ball grooves cross one another securely more outward to said outer race beyond the opening end of the outer race. In other words, it is possible to let them demonstrate the wedge effect securely, and thereby it is possible to securely keep the balls from moving outward to the outer race.

Embodiments

Hereinafter, the present invention will be explained concretely by means of embodiments and comparative examples.

Embodiment No. 1

Figure 2:
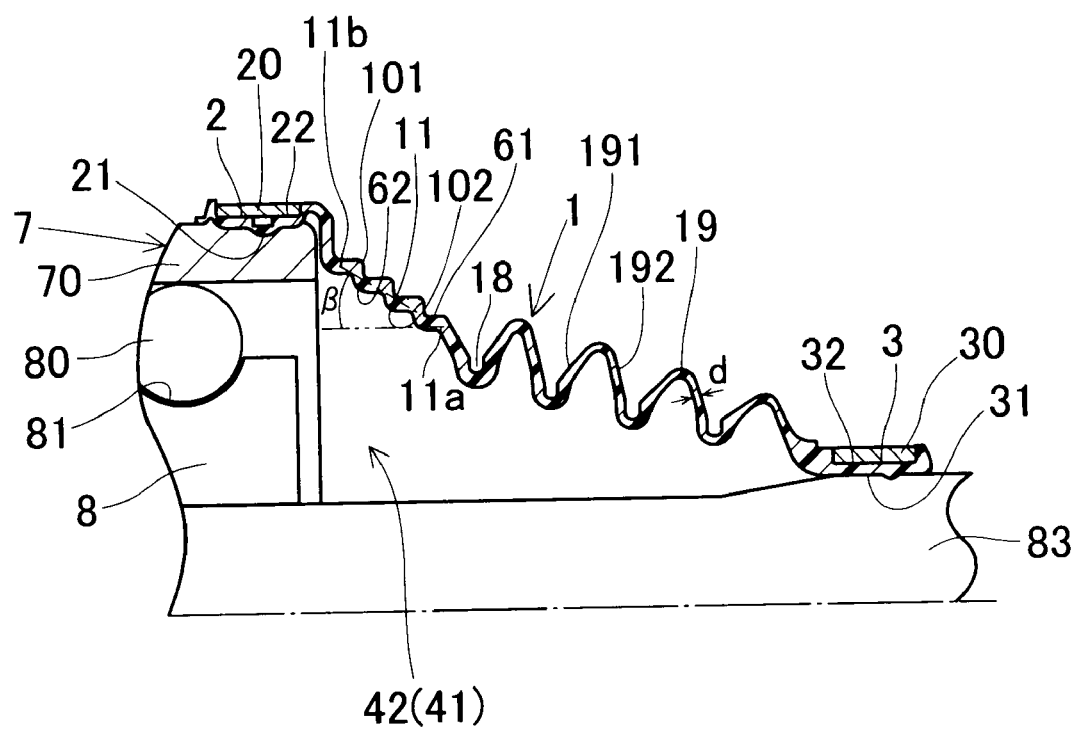
FIG. 2 is a cross-sectional diagram of such a state that the boot is assembled with a constant-velocity universal joint in Embodiment No. 1.

As illustrated in FIG. 1 and FIG. 2, a boot 1 for constant-velocity universal joint that is directed to one of embodiments according to the present invention comprises: a major-diameter cylindrical portion 2; a minor-diameter cylindrical portion 3 being separated away from and being put in place concentrically with the major-diameter cylinder portion 2, and having a smaller diameter than that of the major-diameter cylindrical portion 2; and a substantially-truncated-cone-configured intermediate portion 10 connecting the major-diameter cylindrical portion 2 with the minor-diameter cylindrical portion 3. The intermediate portion 10 comprises: a stretchable bellows portion 19 being connected with the minor-diameter cylindrical portion 3 integrally; and a rigidity-producing portion 11 being connected with the bellows portion 19 and the major-diameter cylindrical portion 2 integrally. The rigidity-producing portion 11 enlarges diametrically from the bellows portion 19 toward the major-diameter cylindrical portion 2, and additionally the outer peripheral surface 101 and inner peripheral surface 102 of the rigidity-producing portion 11 have a plurality of shoulders 61, 62 in a stepwise manner, respectively.

As illustrated in FIG. 3(a), the shoulders 61 on the outer peripheral surface 101 of the rigidity-producing port on 11 are formed by means of the fact that crests "M," which protrude diametrically outward, and roots "V," which dent diametrically inward, are repeated alternately. The shoulders 61 have a side surface 611, which connects between the root "V" and the crest "M" axially, and an end surface 612, which connects between the crest "M" and the root "V" diametrically. The side surface 611 of the shoulders 61 is parallel to the axial direction of the shoulders 61. The end surface 612 of the shoulders 61 is parallel to the diametrical direction of the shoulders 61. In the case where the major-diameter cylindrical portion 2 and the mi nor-diameter cylindrical portion 3 are positioned concentrically, an angle that the side surface 611 and the end surface 612 make at the crests "M" is rectangular; and moreover an angle that the end surface 612 and the side surface 611 make at the roots "V" is also rectangular.

A ratio (B/A), a ratio of a diametrical length (B) of the end surface 612 of the outer peripheral surface 101 with respect to a diametrical thickness (A) of the side surface 611, is 1.39. Here, the diametrical thickness (A) refers to a diametrical thickness at the thinnest part of the side surface 611 of the outer peripheral surface 101.

In the shoulders 62 on the inner peripheral surface 102 of the rigidity-producing portion 11, crests "m," which protrude diametrically outward, and roots "v," which dent diametrically inward, are repeated alternately; and the shoulders 62 have a side surface 621, which connects between the root "v" and the crest "m" axially substantially, and an end surface 622, which connects between the crest "m" and the root "v" diametrically substantially. The side surfaces 621 incline with respect to the axial direction of the shoulders 62 to the diametrically-enlarging side of the rigidity-producing portion 11. That is, the side surfaces 621 incline with respect to the axial direction of the shoulders 62 diametrically outward from the crests "m" toward the roots "v." The end surfaces 622 incline with respect to the diametrical direction of the shoulders 62 to the diametrically-enlarging side of the rigidity-producing portion 11. That is, the end surfaces 622 incline with respect to the diametrical direction of the shoulders 62 to the side of the major-diameter cylindrical portion 2 from the roots "v" toward the crests "m."

The distance between the crests "m" and roots "v" of the shoulders 62 on the inner peripheral surface 102 of the rigidity-producing portion 11, namely, a level difference "h" of the shoulders 62 is smaller than the distance between the crests "M" and roots "V" of the shoulders 61 on the outer peripheral surface 101, namely, a level difference "H." The level difference "H" of the shoulders 61 on the outer peripheral surface 101 of the rigidity-producing portion 11 refers to a distance between a root tangent "VL," which connects between the neighboring roots "V," and a crest tangent "ML," which connects between the neighboring crests "M." The level difference "h" of the shoulders 62 on the inner peripheral surface 102 of the rigidity-producing portion 11 refers to a distance between a root tangent "vL," which connects between the neighboring roots "v," and a crest tangent "mL," which connects between the neighboring crests "m." A wall thickness "D" of the thinnest part of the rigidity-producing portion 11 is equal to a wall thickness "d" of the bellows portion 19 (FIG. 2) approximately. In other words, the rigidity-producing portion 11 has parts that are formed thicker than the wall thickness "d" of the bellows portion 19. The parts of the rigidity-producing portion 11 whose wall thickness is thicker is at around the crest s "m" of the inner peripheral surface 102. Moreover, the number of the shoulders 61 on the outer peripheral surface 101 of the rigidity-producing portion 11, and the number of the shoulders 62 on the inner peripheral surface 102 are four for both of them.

As illustrated in FIG. 1, the bellows portion 19 in which crests "X" and roots "Y" are repeated has rightward-rising slopes 191 and leftward-rising slopes 192 that connect between them as a triangular configuration. The rightward-rising slopes 191 incline to the side of the minor-diameter cylindrical portion 3 with respect to the diametrically outer side of the bellows portion 19. The leftward-rising slopes 192 incline to the side of the major-diameter cylindrical portion 2 with respect to the diametrically outer side of the bellows portion 19. The angle, which the rightward-rising slopes 191 and leftward-rising slopes 192 make at the crests "X" of the bellows portion 19, and the angle, which the rightward-rising slopes 191 and leftward-rising slopes 192 make at the roots "Y," are an acute angle for both of them. Both of the length of the side surfaces 621 of the outer peripheral surface 101 of the rigidity-producing portion 11, and the length of the end surfaces 622 are smaller than the length of the rightward-rising slopes 191 of the outer peripheral surface 19a of the bellows portion 19 and the length of the leftward-rising slopes 192. Therefore, the level difference "H" between the crests "M" and roots "V" on the outer peripheral surface 101 of the rigidity-producing portion 11 as smaller than the level difference between the crests "X" and roots "Y" on the outer peripheral surface of the bellows portion 19.

In the connector portion in the bellows portion 19 that is connected with the rigidity-producing portion 11, a dent 18 is formed diametrically inward, dent 18 whose axially-dented cross section is a letter-"U" grooved configuration. A ratio (P/Q), a ratio of an axial length (P) of the rigidity-producing portion 11 with respect to an axial length (Q) of the bellows portion 19, is 0.5.

The boot 1 comprise synthetic resin; for example, it is formed by blow molding using thermoplastic elastomeric resin, such as TPE (polyester thermoplastic elastomer) or TPO (polyolefin thermoplastic elastomer).

Figure 10:
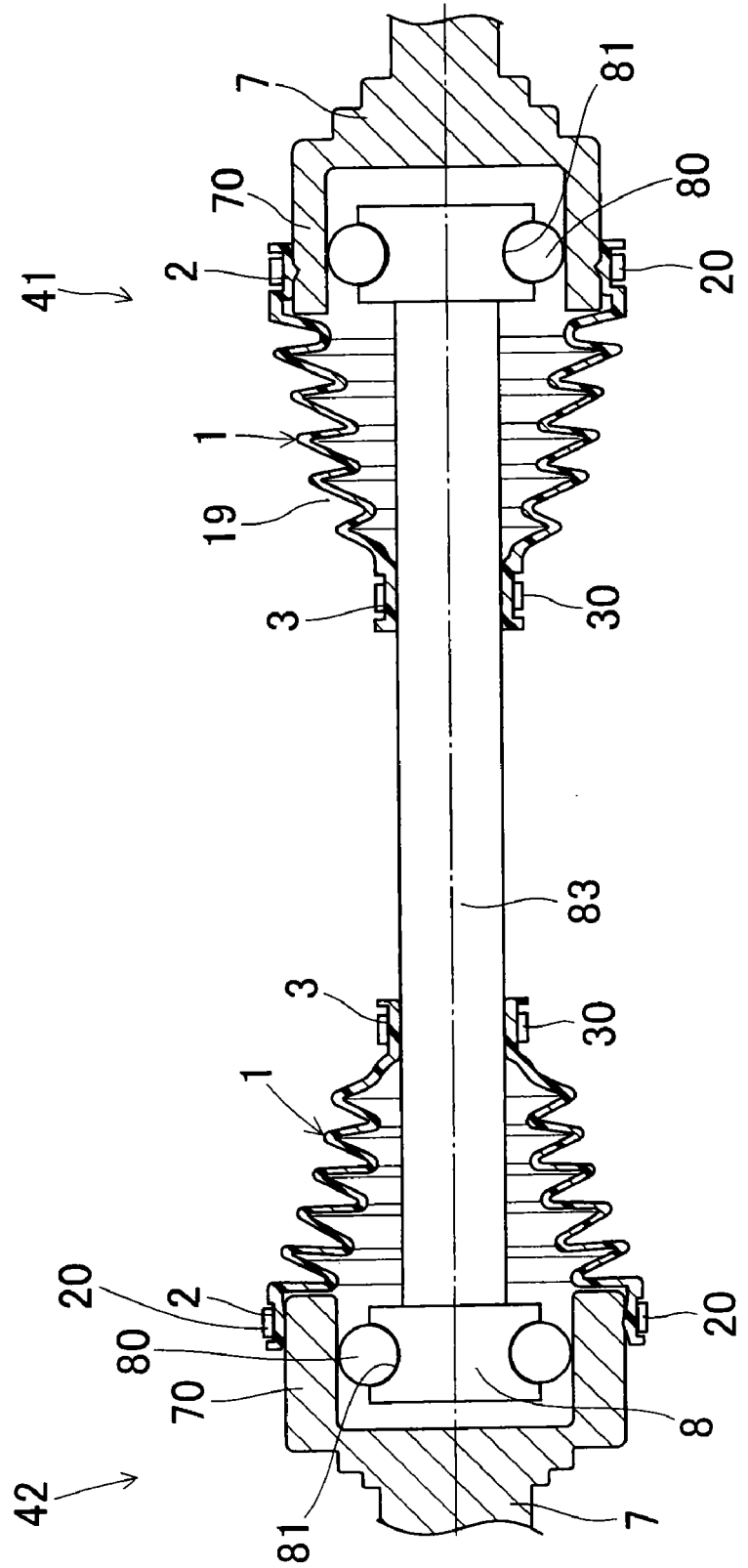
FIG. 10 is a cross-sectional diagram of a drive shaft.

As illustrated in FIG. 2 and FIG. 10, the boot 1 covers and caps joints 41 and 42 that are formed at the axial opposite ends of a shaft 83. The joints 41 and 42 comprise inner races 8, which are fixed to the opposite ends of the shaft 83, outer races 7, and balls 80, which are put in place rollably between the inner races 8 and the cuter races 7. The outer races 7 are formed as a cup shape, and the major-diameter cylindrical portion 2 of the boot 1 is fitted onto and around the inside of that cupped portion 70. The minor-diameter cylindrical portion 3 of the boot 1 is fitted onto and around the shaft 83. And, ring-shaped clamps 20 and 30 are fastened by cramping onto an outer peripheral surface 22 of the major-diameter cylindrical portion 2, and onto an outer peripheral surface 32 of the minor-diameter cylindrical portion 2, respectively.

As illustrated in FIG. 10, the boots 1 for constant-velocity universal joint cover the joint portions 41 and 42 that are disposed at the axial opposite ends of the shaft 83. Thus, the leakage of grease inside the boots 1 is prevented, and additionally the intrusion of water and dust into the inside of the boots 1 is prevented. The cupped portion 70 of the outer races 7 is brought into contact with an inner peripheral surface 21 of the major-diameter cylindrical portion 2 of the boots 1 elastically, thereby fixing it by means of the fastening force of the clamp 20 from its outer peripheral side. Moreover, the minor-diameter cylindrical portion 3 is fixed onto the shaft 83. The inner race 8 is inserted into the cupped portion 70 of the outer races 7 coaxially. A plurality of the balls intervene between the inner races 8 and the outer races 7 peripherally, thereby connecting the inner races 8 with the outer races 7 swingably. And, rotary torque is transmitted at constant velocity from a driving-side member of the outer races 7 and inner races 8 to a driven-side member of the inner races 8 and outer races 7.

Embodiment No. 2

Figure 4:
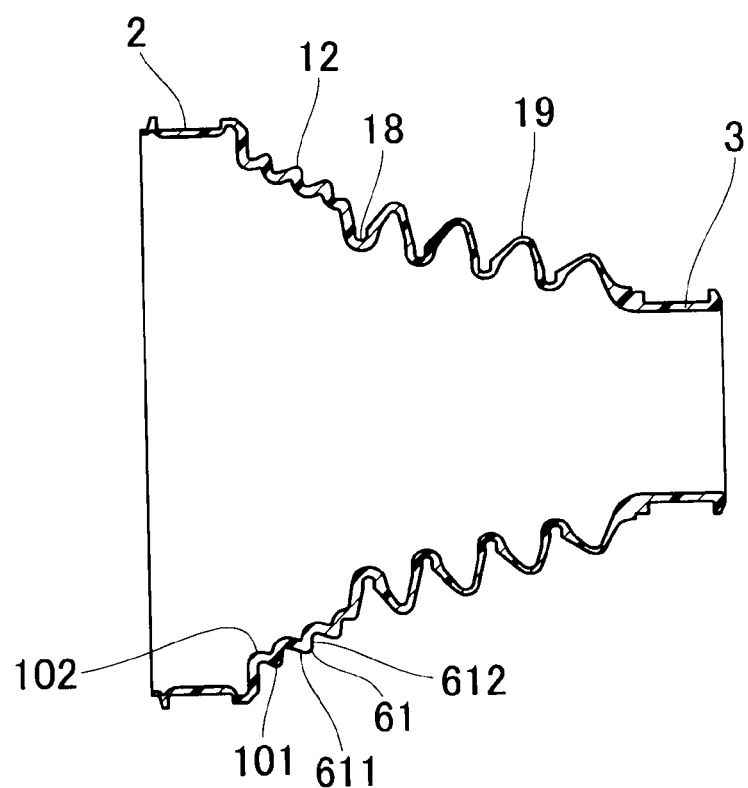
FIG. 4 is a cross-sectional diagram of a boot for constant-velocity universal joint that is directed to Embodiment No. 2.

As illustrated in FIG. 4, in a boot for constant-velocity universal joint according to the present example, the shoulders 61 on the outer peripheral surface 101 of a rigidity-producing portion 12 protrude diametrically more than those of Embodiment No. 1 do, and thereby the side surfaces 611 of the shoulders 61 incline with respect to the axial direction. The end surfaces 612 of the shoulders 61 are parallel to the diametrical direction. The others are the same as those of Embodiment No. 1.

Comparative Example No. 1

Figure 5:
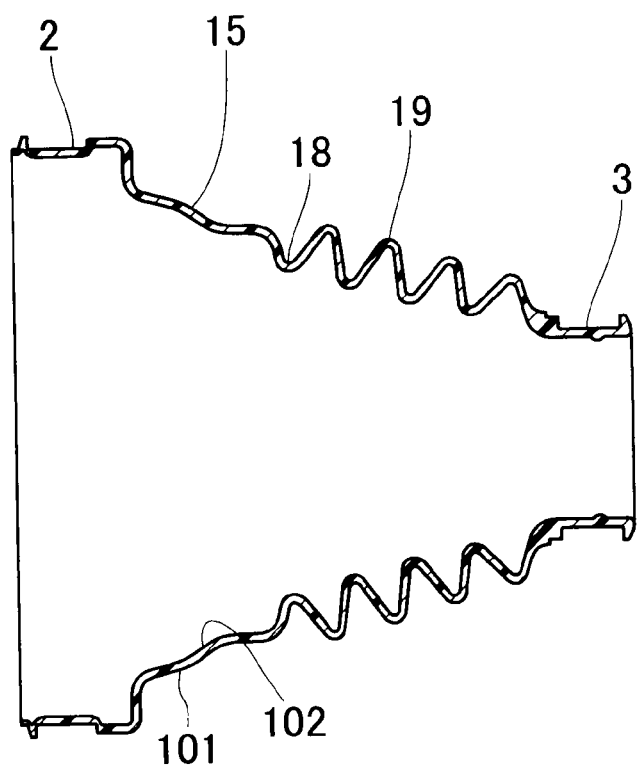
FIG. 5 is a cross-sectional diagram of a boot for constant-velocity universal joint that is directed to Comparative Example No. 1.

As illustrated in FIG. 5, in a boot according to the present comparative example, a rigidity-producing portion 15 has a bowl configuration that spreads from the bellows portion 19 toward the major-diameter cylindrical portion 2, and thereby no shoulders are present on its outer peripheral surface 101 and inner peripheral surface 102. The other elements are the same as those of Embodiment No. 1.

Comparative Example No. 2

Figure 6:
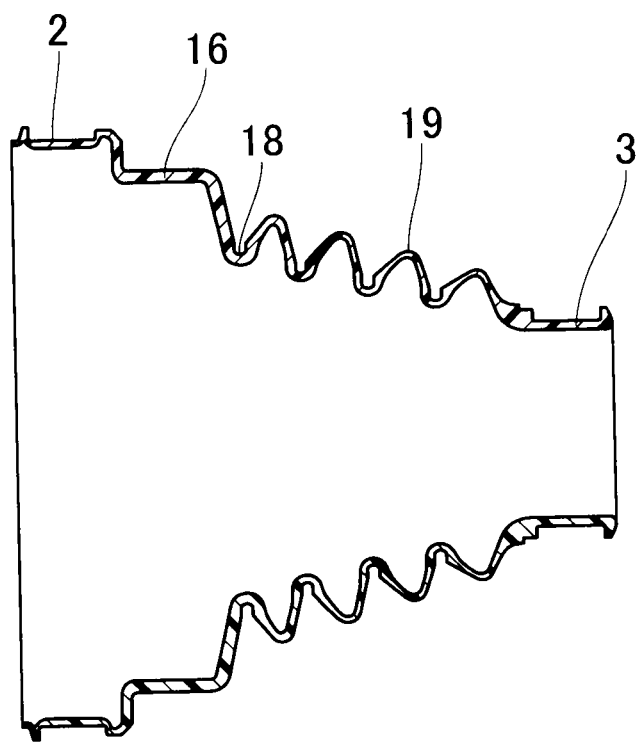
FIG. 6 is a cross-sectional diagram of a boot for constant-velocity universal joint that is directed to Comparative Example No. 2.

As illustrated in FIG. 6, a boot according to the present comparative example differs from Embodiment No. 1 in that the entirety of a rigidity-producing portion 16 has a cylindrical shape. The diameter of the rigidity-producing portion 16 is larger than that of the bellows portion 19, and is smaller than that of the major-diameter cylindrical portion 2. The other elements are the same as those of Embodiment No. 1.

Comparative Example No. 3

Figure 7:
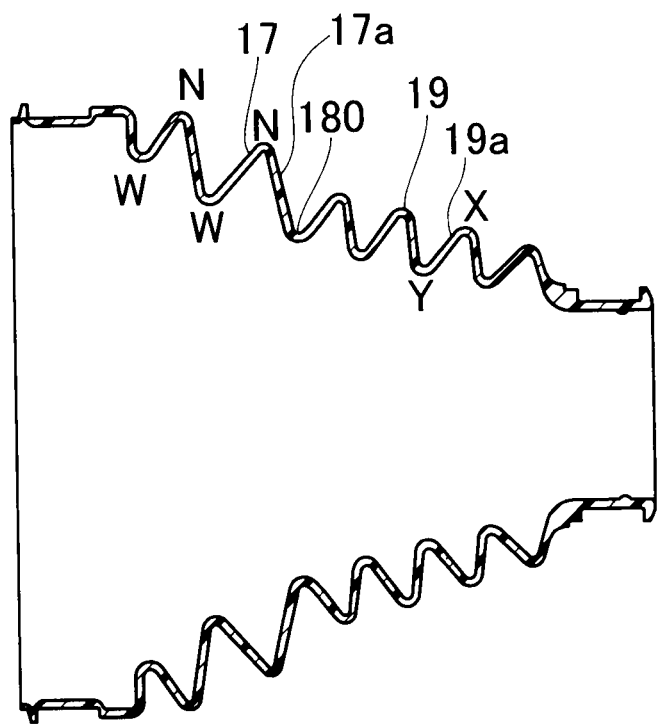
FIG. 7 is a cross-sectional diagram of a boot for constant-velocity universal joint that is directed to Comparative Example No. 3.

As illustrated in FIG. 7, a boot according to the present comparative example differs from Embodiment No. 1 in that a rigidity-producing portion 17 has a bellows configuration. The rigidity-producing portion 17 has a configuration in which a root "W" and a crest "N" are repeated twice. A level difference "H" between the crest "N" and root "W" on an outer peripheral surface 17a of the rigidity-producing portion 17 is larger than a level difference between the crest "X" and root "Y" on an outer peripheral surface 19a of the bellows portion 19. A root 180 is formed at the connector portion between the rigidity-producing portion 17 and the bellows portion 18. The other elements are the same as those of Embodiment No. 1.

(Evaluation)

The boots according to Embodiment Nos. 1 and 2 and Comparative Example Nos. 1-3 were evaluated or the following physical properties.

(Torque for Folding or Bending)

Torques were measured, torques which were required for folding or bending the rigidity-producing portions of the boots. The required torques were evaluated according to a 4-level criterion. "⊚" represents a case where a rigidity-producing portion could be folded or bent with considerably large torque; "○" represents a case where a rigidity-producing portion could be folded or bent with large torque; "Δ" represents a case where a rigidity-producing portion could be folded or bent with medium-level torque; and "X" represents a case where a rigidity-producing portion could be folded or bent with small torque.

(Fatigue Property)

An experiment was carried out, experiment in which the rigidity-producing portions of the boots were left as they were in such a state that they were folded or bent at a predetermined angle under high-heat environment for a predetermined period of time. Before and after the experiment, the stress changes were measured, and then the endurance times for such a case as the stress changes are a predetermined magnitude or less. A case where an endurance time was a predetermined time or more was labeled "○"; and a case where it was less than the predetermined time was labeled "X."

(Interference Property)

As illustrated in FIG. 10, the major-diameter cylindrical portion 2 of the boots 1 was fixed onto the cupped portion 70 of the outer races 7 using the clamp 20, and the minor-diameter cylindrical portion 3 was fixed onto the shaft 83 using the clamp 30. Thus, the boots 1 were assembled with the joints 41 and 42 that comprised the outer races 7, the balls 80 and the inner races 8. Under the circumstances, the boots were examined whether they interfered with the balls and outer races or not when the shaft 83 was raised. A case where the boots did not interfere with the balls and outer races was labeled "○"; and a case where they interfered with those was labeled "X."

Judging comprehensively from the respective measurement results mentioned above, the comprehensive characteristics of the boots were evaluated according to the following: "⊚" (best); "○" (good); "Δ" (ordinary); and "X" (faulty). The evaluation results are given in Table 1.

TABLE 1

| Configuration | Embodiment No. 1 Stepped Shape (FIG. 1) | Embodiment No. 2 Taper-shaped Steps (FIG. 4) | Comp. Ex. No. 1 Bowl Shape (FIG. 5) | Comp. Ex. No. 2 Cylindrical Shape (FIG. 6) | Comp. Ex. No. 3 Bellows Shape (FIG. 7) |
|---|---|---|---|---|---|
| Torque for Folding or Bending | ⊚ | ○ | Δ | Δ | x |
| Fatigue Property | ○ | ○ | ○ | ○ | |
| Interference Property | ○ | ○ | Δ | Δ | x |
| Comprehensive Evaluation | ⊚ | ○ | Δ | Δ | x |

According to the above table, in Embodiment Nos. 1 and 2, favorable results were obtained on all of the physical-property evaluations. On the contrary, Comparative Example Nos. 1-3 were small in the torque for folding or bending, and low in the rigidity of the rigidity-producing portions.

From the evaluations mentioned above, Embodiment Nos. 1 and 2 were high in the rigidity of the rigidity-producing portions, and had configurations that were less likely to deform with respect to external force. The reason is believed as follows: since the rigidity-producing portions of Embodiment Nos. 1 and 2 had a plurality of the step-shaped shoulders, high rigidity was obtained, compared with the bowl configuration of that in Comparative Example No. 1, the cylindrical configuration of that in Comparative Example No. 2 and the bellows configuration of that in Comparative Example No. 3. From this fact, the rigidity in the vicinity of the major-diameter cylindrical portion enhances by means of adapting the vicinity of the major-diameter cylindrical portion into the rigidity-producing portion that possesses a plurality of the step-shaped shoulders, compared with the case where a part, which is identical with the rigidity-producing portion in a boot with an identical size, is adapted into a bowl configuration, cylindrical configuration or bellows configuration that has an identical volume.

Figure 3B:
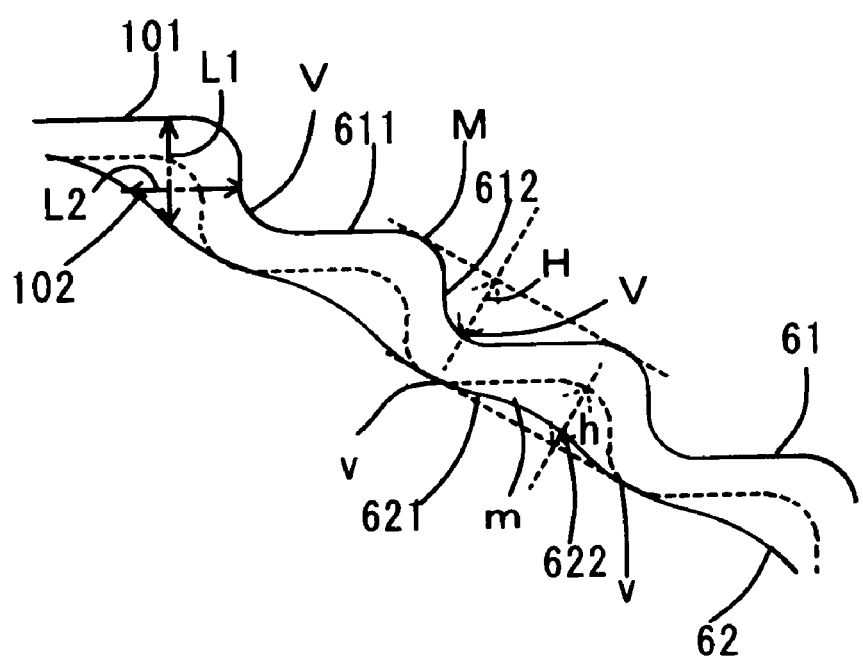
FIG. 3 (b) is a cross-sectional explanatory diagram of a rigidity-producing portion in the case where a level difference "H" of shoulders, which are formed on the outer peripheral surface of the rigidity-producing portion, and a level difference "h" of shoulders, which are formed on the inner peripheral surface, are the same with each other.

Moreover, in Embodiment No. 1, the boot is manufactured by blow molding. Accordingly, the inner peripheral surface of the boot is less likely to be molded as the same configuration as that of the outer peripheral surface, and has s such a tendency that it possesses a gentler inclination than that of the outer peripheral surface. Hence, in Embodiment No. 1, the inner peripheral surface 102 of the rigidity-producing portion 11 comes to possess the end surfaces 622 that incline with respect to the diametrical direction, and the side surfaces 621 that incline with respect to the axial direction, as illustrated in FIG. 3(b). The level difference "h" of the shoulders 62 that are formed on the inner peripheral surface 102 of the rigidity-producing portion 11 is smaller than the level difference "H" of the shoulders 61 that are formed on the outer peripheral surface 101. Accordingly, the diametrical thickness "L1" between the side surfaces 611 of the shoulders 61 on the outer peripheral surface 101 and the inner peripheral surface 102 becomes large, compared with the case where both of the level differences "H" and "h" are identical (the dotted line in FIG. 3(b)). Moreover, the axial thickness "L2" between the end surfaces 612 of the shoulders 61 on the outer peripheral surface 101 and the inner peripheral surface 102 becomes large. This fact is also believed to be one of the factors of the upgraded rigidity of the rigidity-producing portion 11.

Figure 8:
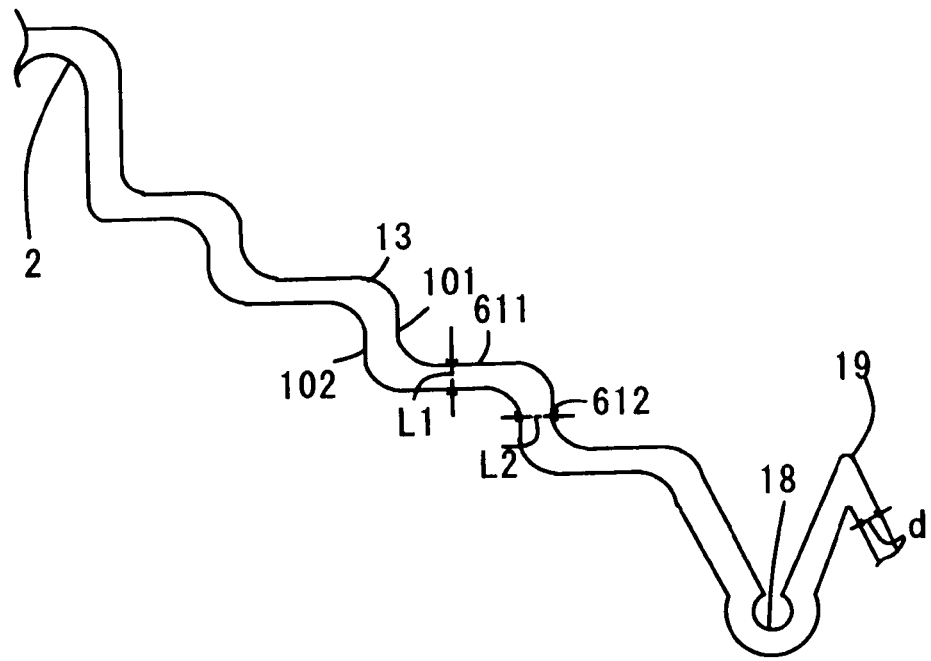
FIG. 8 is a cross-sectional explanatory diagram of the rigidity-producing portion according to a modified version.

As a modified embodiment, it is also feasible to mold the inner peripheral surface 102 of a rigidity-producing portion 13 as the same configuration as that of the outer peripheral surface 101, as illustrated in FIG. 8, when molding it by injection molding, and the like. In this case, the diametrical thickness "L1" between the side surfaces 611 of the shoulders 61 on the outer peripheral surface 101 and the inner peripheral surface 102 becomes equal to the thickness "d" of the bellows portion 19 approximately. Moreover, the axial thickness "L2" between the end surfaces 612 of the shoulders 61 on the outer peripheral surface 101 and the inner peripheral surface 102 becomes also equal to the thickness "d" of the bellows portion 19 approximately. In this case as well, the cross-sectional coefficient is higher than that of cylindrical configuration, because the rigidity-producing portion 13 has a stepped configuration. Hence, the rigidity-producing portion 13 demonstrates high rigidity, and is less likely to deform when being raised; and thereby it is possible to keep it from interfering with the balls.

Figure 9:
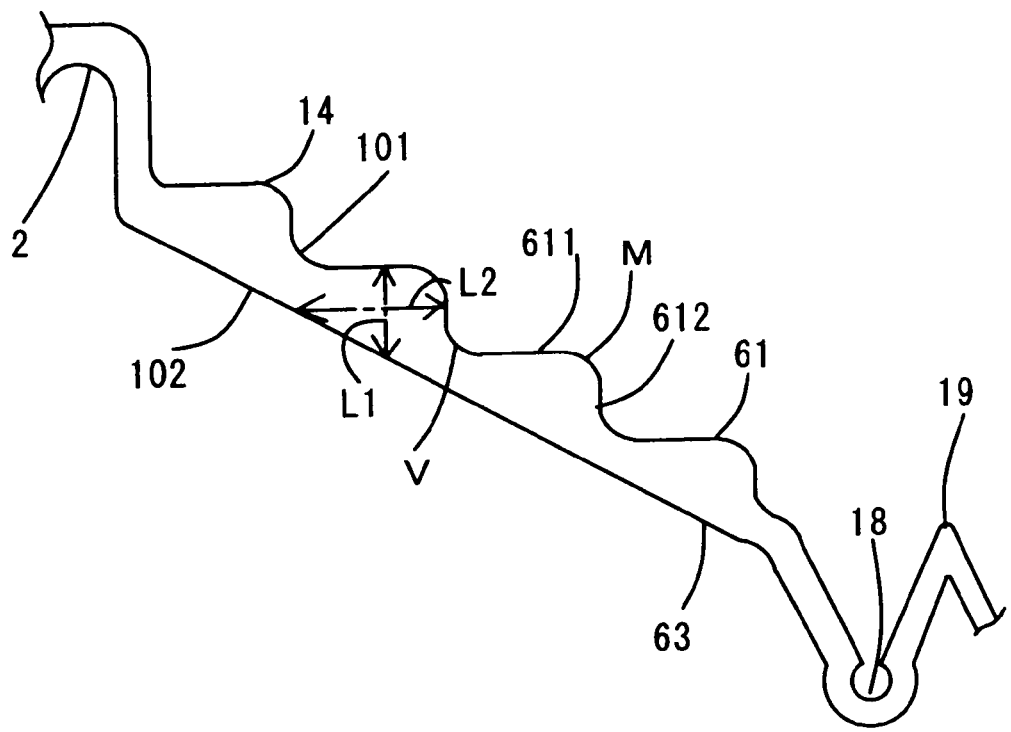
FIG. 9 is a cross-sectional explanatory diagram of the rigidity-producing portion according to another modified version.

Moreover, as another modified embodiment, it can be adapted so that the shoulders 61 with a stepped configuration are formed on the outer peripheral surface 101 of a rigidity-producing portion 14; and so that its inner peripheral surface 102 is free of any shoulders but are formed as a slope 63, which slopes linearly from the bellows portion 19 toward the major-diameter cylindrical portion 2; as illustrated in FIG. 9. In this case, the diametrical thickness "L1" between the side surfaces 611 of the shoulders 61 on the outer peripheral surface 101 and the inner peripheral surface 102 becomes larger than that in the instance of Embodiment No. 1; and moreover the axial thickness "L2" between the end surfaces 612 of the shoulders 61 on the outer peripheral surface 101 and the inner peripheral surface 102 becomes larger than that therein. Consequently, rigidity that is much higher than that of Embodiment No. 1 is obtainable.

Embodiment No. 3

Figure 11:
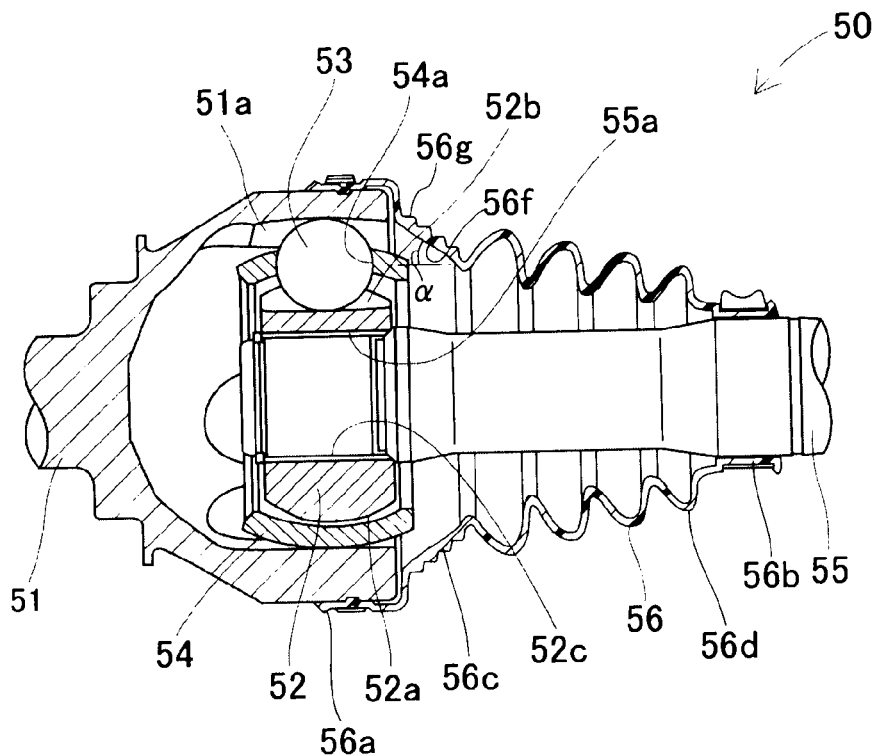
FIG. 11 illustrates an axial cross-sectional diagram of a constant-velocity universal joint 10 that is directed to Embodiment No. 3 in the case where the joint angle is 0 degree.
Figure 12:
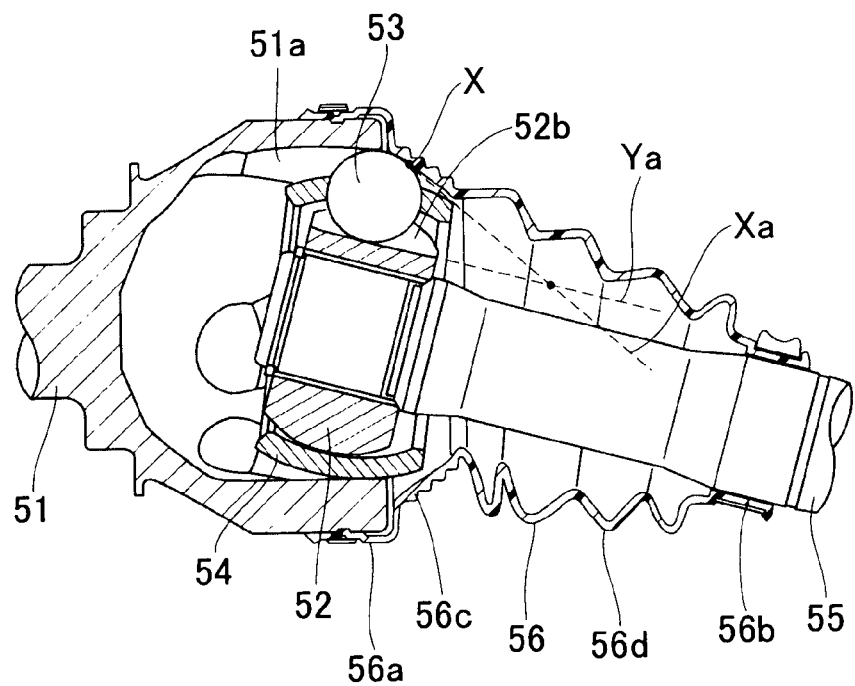
FIG. 12 illustrates an axial cross-sectional diagram of the constant-velocity universal joint 10 that is directed to Embodiment No. 3 in the case where the joint angle is an angle of a predetermined value or more.
Figure 13:
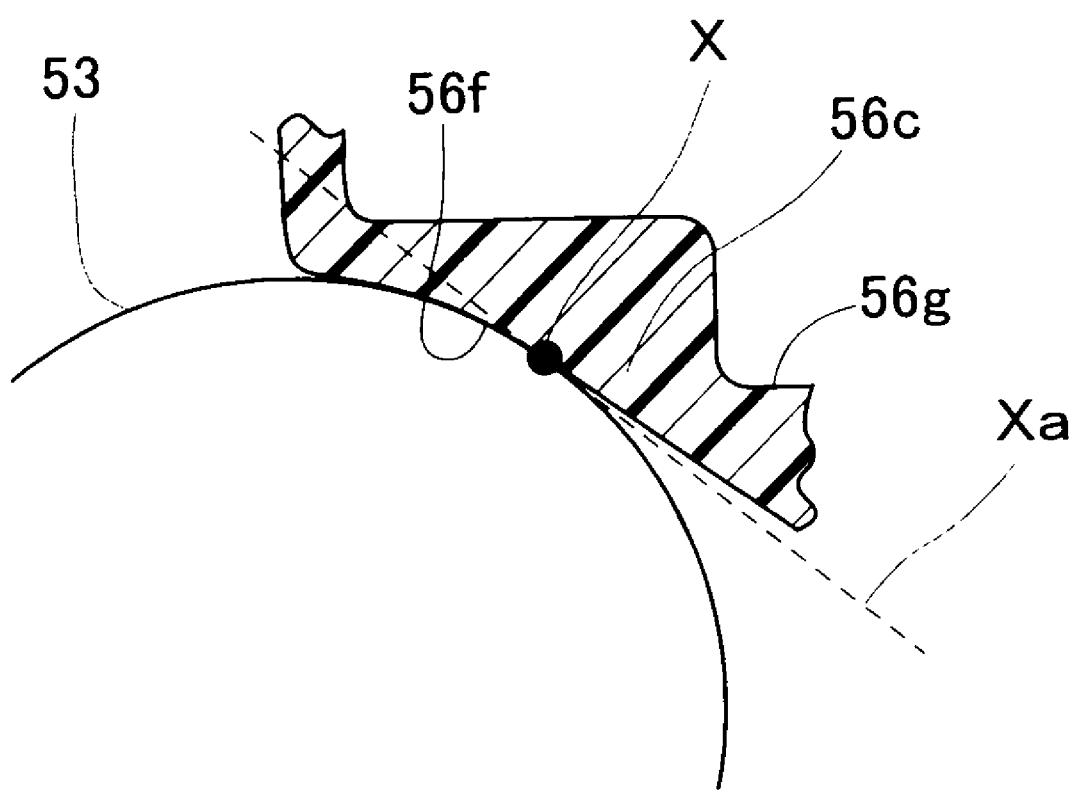
FIG. 13 illustrates an enlarged diagram of a coming-in-contact section between a ball 53 and a tapered portion 56c in FIG. 2, enlarged diagram which is directed to Embodiment No. 3.

A cross-grooved constant-velocity universal joint 50 according to the present example (hereinafter referred to as "constant-velocity universal joint") will be explained with reference to FIG. 11-FIG. 13. FIG. 11 illustrates an axial cross-sectional diagram of the constant-velocity universal joint 50 in the case where the joint angle is 0 degree. FIG. 12 illustrates an axial cross-sectional diagram of the constant-velocity universal joint 50 in the case where the joint angle is an angle of a predetermined value or more. FIG. 13 illustrates an enlarged diagram of a coming-in-contact section between a ball 53 and a rigidity-producing portion 56c in FIG. 12.

As illustrated in FIG. 11, the constant-velocity universal joint 50 is provided with an outer race 51, an inner race 52, balls 53, a retainer 54, a shaft 55, and a boot 56.

The outer race 51 is formed as a cup shape (bottomed cylindrical shape). In the inner peripheral of this outer race

51, a plurality of outer-race ball grooves 51a are formed. These outer-race ball grooves 51a are formed in a direction that twists with respect to the outer-race rotary axis (the central axis of the outer race 51), and are formed so that the groove centers become linear. And, the neighboring outer-race ball grooves 51a are formed so that the twisting directions become opposite directions one another. That is, the neighboring outer-race ball grooves 51a are positioned so that they are in proximity to each other on one end side of the outer race 51 (on the right-end side in FIG. 11, for instance), and so that they get away from each other on another end side (the left-end side in FIG. 11, for instance). Further, one of the opposite ends of the outer-race ball grooves 51a are formed so as to open up to the opening end of the outer race 51.

The inner race 52 comprises a cylindrical shape. The outer peripheral surface of this inner race 52 is formed as a convexed spherical shape. Concretely speaking, an outermost peripheral surface 52a of the convexed-sphere-shaped outer peripheral surface of the inner race 52 is formed as a configuration that can be approximated to a uniform convexed arc shape when viewing it in the axial cross section, namely, a configuration that can be approximated to a convex-shaped partial spherical shape. Further, in the outer peripheral surface of the inner race 52, a plurality of inner-race ball grooves 52b are formed. These inner-race ball grooves 52b are formed in a direction that twists with respect to the inner-race rotary axis of the inner race (the central axis of the inner race 52), and are formed so that the groove centers are linear. Therefore, the bottom of the inner-race ball grooves 52b also becomes linear naturally. And, the neighboring inner-race ball grooves 52b are formed so that the twisting directions become opposite directions one another. That is, the neighboring inner-race ball grooves 52b are positioned so that they are in proximity to each other on one end side of the inner race 52, and so that they get away from each other on another end side. Moreover, in the inner peripheral surface of the inner race 52, inner-peripheral splines 52c are formed. These inner-peripheral splines 52c are inserted/fitted into (meshed with) later described outer-peripheral splines 55a, which are formed at an opposite end of the shaft 55.

And, this inner race 52 is put in place on an inner side of the outer race 51. Further, the inner race 52 is put in place slidably in outer-race rotary-axis directions with respect to the outer race 51. On this occasion, each of the inner-race ball grooves 52b of the inner race 52 crosses each of the outer-race ball grooves 51a of the outer race 51 in such a state that they are viewed from a diametrically outer side.

The balls 53 are put in place so that each of them locks peripherally with respect to each of the outer-race ball grooves 51a of the outer race 51 and with respect to each of the inner-race ball grooves 52b of the inner race 52, and so that they are capable of rolling within the outer-race ball grooves 51a and inner-race ball grooves 52b. These balls 53 are put in place at intersections at which the outer-race ball grooves 51a and the inner-race ball grooves 52b cross one another. Concretely speaking, the balls 53 are put in place at positions at which the groove centers of the outer-race ball grooves 51a (corresponding to the balls' loci in the outer-race ball grooves 51a) and the groove centers of the inner-race ball grooves 52b (corresponding to the balls' loci in the inner-race ball grooves 52b) cross one another peripherally in such a state that they are viewed from a diametrically outer side. That is, by means of the balls 53, torque is transmitted between the outer race 51 and the inner race 52. Note that the balls 53 are put in place in a quantity as many as the number of the outer-race ball grooves 51a and inner-race ball grooves 52b.

The retainer 54 comprises a substantially cylindrical shape. Concretely speaking, the inner peripheral surface of the retainer 54 as formed as a concave-shaped partial sphere shape that corresponds to the outermost peripheral surface 52a of the inner race 52 virtually, and the outer peripheral surface of the retainer 54 is also formed as a convex-shaped partial spherical shape. And, the retainer 54 is put in place between the outer race 51 and the inner race 52. Concretely speaking, the retainer 54 is put in place between the inner peripheral surface of the outer race 51 and the outermost peripheral surface 52a of the inner race 52. Further, in this retainer 54, substantially rectangular windows 54a are formed plurally at equal intervals peripherally. These windows 54a are formed in a quantity as many as the number of the balls 53. Into these windows 54a, the balls 53 are inserted, respectively. That is, the retainer 54 retains the balls 53.

The shaft 55 is a shaft for power transmission, such as a drive shaft, for instance. In an outer peripheral surface on an opposite-end side of this shaft 55, the outer-peripheral splines 55a are formed. These outer-peripheral splines 55a are inserted/fitted into (meshed with) the inner-peripheral splines 52c of the inner race 52, and thereby the shaft 55 is connected with the inner race 52 coaxially.

The boot 56 is formed integrally as a bellows-like cylindrical shape. This boot 56 is molded by means of a heretofore known method, such as blow molding or injection molding, using synthetic resin, rubber, or the like. Note that, as for the synthetic resin, thermoplastic resin, such as TPE (polyester thermoplastic elastomer) or TPO (polyolefin thermoplastic elastomer), is used. This boot 56 seals the opening side of the outer race 51. That is, the inner race 52, balls 53 and retainers 54 are put in place within a confined space by means of the outer race 51 and boot 56. Note that a lubricant agent, such as grease, is sealed within this confined space.

Specifically speaking, this boot 56 is constituted of a major-diameter cylindrical portion 56a, a minor-diameter cylindrical portion 56b, a rigidity-producing portion 56c, and a bellows portion 56d; and these are formed integrally. Moreover, the rigidity-producing portion 56c is formed so that it has a larger wall thickness than that of the bellows portion 56d, and thereby the rigidity is enhanced compared with that of the bellows portion 56d.

The major-diameter cylindrical portion 56a comprises a cylindrical shape, and is fixed onto an opening-end outer peripheral surface of the outer race 51 by fastening by means of a clamping member. The minor-diameter cylindrical portion 56b comprises a cylindrical shape with a smaller diameter than that of the major-diameter cylindrical portion 56a. This minor-diameter cylindrical portion 56b is fixed onto an outer peripheral surface of the shaft 55 by fastening by means of a clamping member. The position on the shaft 55 at which the minor-diameter cylindrical portion 56b is fixed by fastening lies on a more axially central-portion side than the forming positions of the outer-peripheral splines 55a lie (on the right side in FIG. 11), and is positioned on a more right side in FIG. 11 than the position at which the major-diameter cylindrical portion 56a is fixed onto the outer race 51 by fastening is placed (more outward to the outer race 51 beyond the opening end of the outer race 51).

The rigidity-producing portion 56c is connected integrally with a side of the major-diameter cylindrical portion 56a facing the minor-diameter cylindrical portion 56b (the right end in FIG. 11), and is formed as a tapered shape that reduces diametrically toward the minor-diameter cylindrical portion 56b. That is, the maximum diameter of the rigidity-producing portion 56c is the same diameter as that of the major-diameter cylindrical portion 56a. And, the major-diameter side of the rigidity-producing portion 56c is positioned at around the opening-end outer peripheral surface of the outer race 51. On the contrary, the minimum radius of the rigidity-producing portion 56c is made smaller than a distance from the central axis of the outer race 51 to the groove bottom of the outer-race ball grooves 11a. That is, the minor-diameter side of the rigidity-producing portion 56c is positioned away from the outer-race ball grooves 51a outward in the direction of the outer-race rotary shaft of the outer race 51. Further, the rigidity-producing portion 56c is put in place so as to cover and cap at least the diametrical outside of the outer-race ball grooves 51a. Moreover, the minimum radius of the rigidity-producing portion 56c is made larger than the inside diameter of the minor-diameter cylindrical portion 56b.

Figure 14:
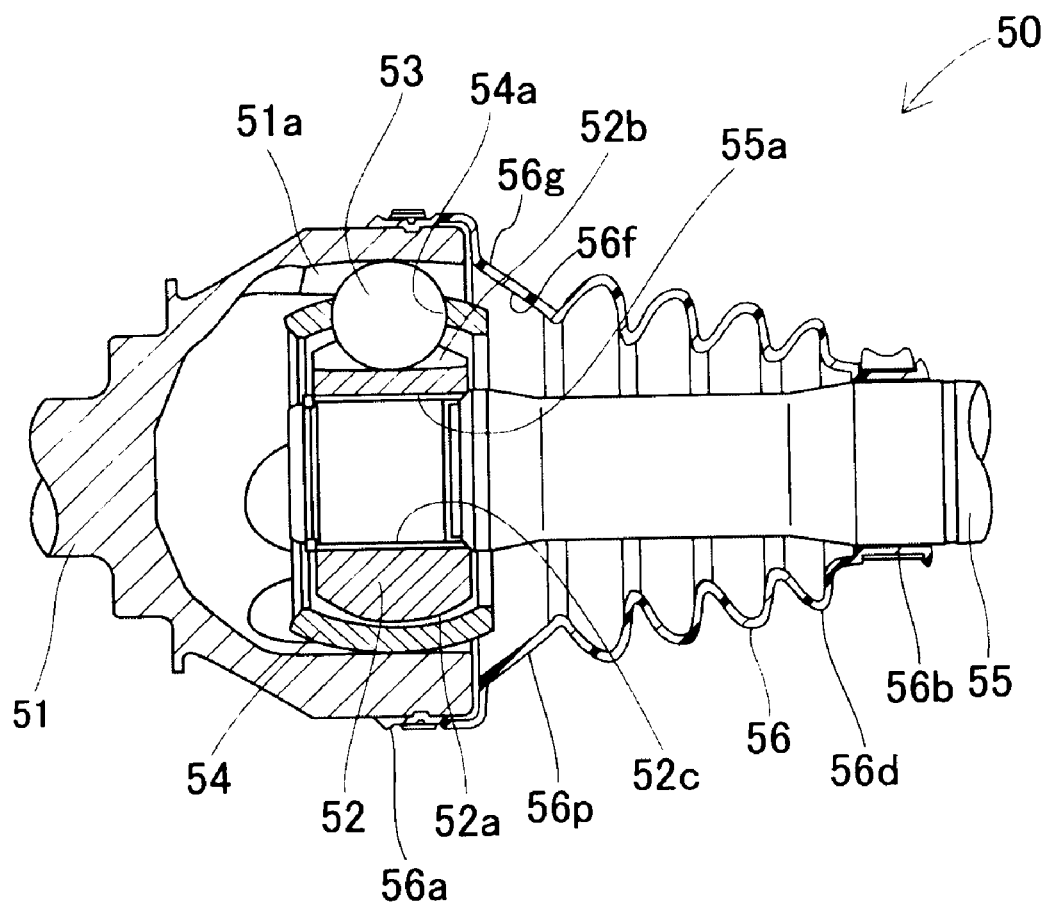
FIG. 14 illustrates an axial cross-sectional diagram of a constant-velocity universal joint 10 that serves as Reference Example in the case where the joint angle is 0 degree.
Figure 15:
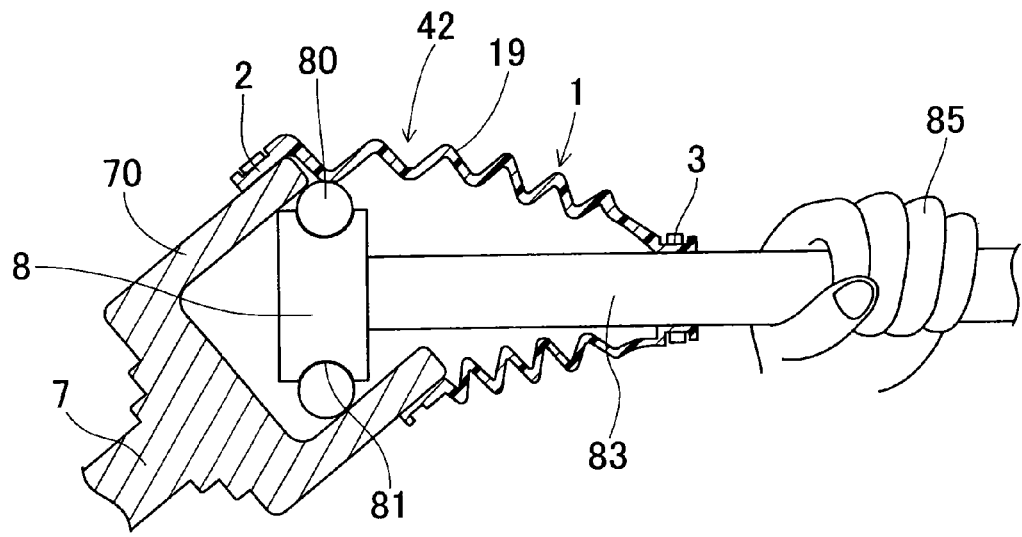
FIG. 15 is an explanatory diagram that is directed to a conventional example, explanatory diagram which is for illustrating a problematic issue when a drive shaft is raised.
Figure 16:
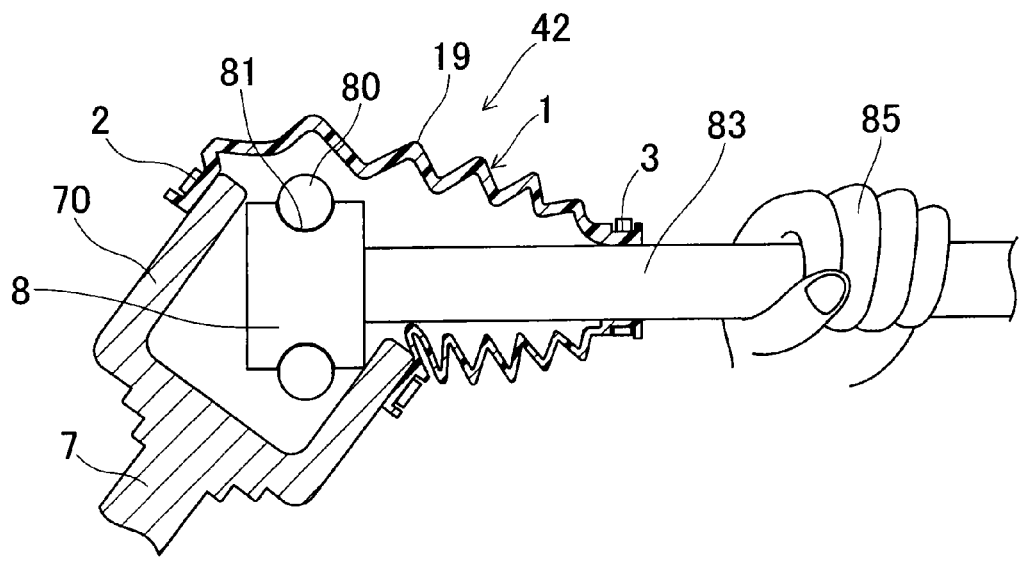
FIG. 16 is an explanatory diagram that is directed to the conventional example, explanatory diagram which is for illustrating a problematic issue when the drive shaft is raised.

Here, in the rigidity-producing portion 56c, the outer peripheral surface possesses a plurality of shoulders in a stepwise manner, and the inner peripheral surface is a tapered shape. The "tapered shape" means to include not only linearly-shaped ones but also curved or stepped ones in the axial cross-section. That is, the aforesaid tapered shape not only includes tapered shapes that reduce diametrically continuously but also tapered shapes that reduce diametrically intermittently. Specifically speaking, the axial cross-sectional configuration of the inner peripheral surface in the rigidity-producing port ion 56c therefore includes linear shapes, curved shapes, stepped shapes, and the like. Especially, it is desirable that the axial cross-sectional configuration of the inner peripheral surface in the rigidity-producing portion 56c can be a tapered shape that reduces diametrically continuously. In FIG. 11, the axial cross-sectional configuration of the inner peripheral surface 56f of the rigidity-producing portion 56c is shown as a substantially-linear tapered shape diagrammatically, and the axial cross-sectional configuration of the outer peripheral surface 56g is shown diagrammatically to possess a plurality of shoulders in a stepwise manner. Note that, for reference, an instance is illustrated in FIG. 14, instance where not only the inner peripheral surface 56f of the rigidity-producing portion 56c but also the outer peripheral surface 56g are a linear tapered shape.

Moreover, for the boot 56 that includes this rigidity-producing portion 56c, thermoplastic resin, rubber, or the like, is used as described above. Therefore, the rigidity-producing portion 56c itself is capable of undergoing bending deformation (flexure deformation) slightly, and further the rigidity-producing portion 56c is capable of undergoing bending deformation slightly at the connector section with the major-diameter cylindrical portion 56a.

The bellows portion 56d is formed as a bellows-like cylindrical shape, and has stretchability. This bellows portion 56d is disposed integrally between the minor-diameter side of the rigidity-producing portion 56c and the minor-diameter cylindrical portion 56b. That is, an opposite-end side of the bellows portion 56d (on the left side in FIG. 11) is connected integrally with the minor-diameter side of the rigidity-producing portion 56c (on the right side in FIG. 11). On the contrary, another opposite-end side of the bellows portion 56d (on the right side in FIG. 11) is connected integrally with a side of the minor-diameter cylindrical portion 56b facing the major-diameter cylindrical portion 56a (on the left side in FIG. 11).

Next, the constant-velocity universal joint 50 will be explained with reference to FIG. 12, constant-velocity universal joint 50 which is at the time when a joint angle (the inclination angle between the central axis of the outer race 51 and the central axis of the shaft 55) takes an angle of a predetermined value or more.

On this occasion, namely, when a joint angle takes an angle of a predetermined value or more, the bellow portion 56d of the boot 56 deforms. Concretely speaking, of the bellows portion 56d, the sections at which the intervening distance between the major-diameter cylindrical portion 56a and the minor-diameter cylindrical portion 56b comes closer (on the lower side in FIG. 12) undergo contraction deformation, and the sections at which the intervening distance between the major-diameter cylindrical portion 56a and the minor-diameter cylindrical portion 56b gets away (on the upper side in FIG. 12) undergo extension deformation.

Moreover, the rigidity-producing portion 56c deforms, even though the deformation is very subtle compared with that of the bellows portion 56d. Concretely speaking, of the rigidity-producing portion 56c, the sections at which the intervening distance between the major-diameter cylindrical portion 56a and the minor-diameter cylindrical portion 56b comes closer (on the lower side in FIG. 12) undergo bending deformation at the connector section with the major-diameter cylindrical portion 56a and at the connector section with the bellows portion 56d so that the axial length becomes shorter, because of the fact that they are pressed by the contracted bellows portion 56d. Moreover, of the rigidity-producing portion 56c, the sections at which the intervening distance between the major-diameter cylindrical portion 56a and the minor-diameter cylindrical portion 56b gets away (on the upper side in FIG. 12) undergo tensile deformation so as to approach the line that connects between the end of the major-diameter cylindrical portion 56a on the side that faces the minor-diameter cylindrical portion 56b (on the right side in FIG. 12) and the end of the minor-diameter cylindrical portion 56b on the side that faces the major-diameter cylindrical portion 56a (on the left side in FIG. 12).

Here, a plane that passes all of the ball centers of the multiple balls 53 inclines with respect to a plane that crosses perpendicularly to the central axis of the outer race 51. That is, in the multiple balls 53, the following exist: those that are positioned at the axially central portion of the outer race 51; those that are positioned toward the side of the cupped bottom of the outer race 51 more than the aforesaid central portion lies; and those that are positioned toward the side of the opening end of the outer race 51 more than the aforesaid central portion lies (the balls 53 shown in FIG. 12). Here, the balls 53 that are positioned at around the opening end of the outer race 51 try to move outward to the outer race 51 beyond the opening end of the outer race 51. That is, the aforesaid balls 53 try to move to positions at which they can separate from the outer race 51 and retainer 54.

It follows that the balls 53 that are positioned at around the opening end of the outer race 51 come in contact with the sections of the rigidity-producing portion 56c, sections at which the intervening distance between the major-diameter cylindrical portion 56a and the minor-diameter cylindrical portion 56b gets away (on the upper side in FIG. 12). That is, the aforesaid balls 53 turn into such a state that they come in contact with the inner peripheral surface of the rigidity-producing portion 56c. On this occasion, the aforesaid balls 53 maintain such a state that they lock peripherally with respect to the outer-race ball grooves 51a. Therefore, the aforesaid balls 53 are kept from moving outward to the outer race 51, because of the fact that they come in contact with the rigidity-producing portion 56c.

Here, as illustrated in FIG. 13, since the rigidity-producing portion 56c with which the aforesaid balls 53 come in contact undergoes flexure deformation slightly following the outer surface of the balls 53, the aforesaid balls 53 and the rigidity-producing portion 56c turn into a state of plane contact. Of these tangential planes, a tangent plane at the position "X" that is furthermost away from the cupped bottom of the outer race 51 (the rightmost positions in FIG. 12 and FIG. 13) makes "Xa." And, with respect to an extension line "Ya" of the bottom of the inner-race ball grooves 52*b* in which the aforesaid balls 53 that come in contact with the rigidity-producing portion 56*c* are put in place (or are locked), this tangent plane "Xa" cross outward to the outer race 51 beyond the opening end of the outer race 51.

That is, it is possible to demonstrate a wedge effect by means of the rigidity-producing portion 56*c* of the boot 56 and the inner-race ball grooves 52*b* of the inner race 52. Therefore, the balls 53 are kept from moving outward to the outer race 51 more securely by means of this wedge effect, and thereby it is possible to prevent the balls 53 from coming off from the outer race 51. In particular, as described above, the balls 53 come in contact with the sections of the rigidity-producing portion 56*c*, sections at which the intervening distance between the major-diameter cylindrical portion 56*a* and the minor-diameter cylindrical portion 56*b* gets away (on the upper side in FIG. 12), namely, of the rigidity-producing portion 56*c*, the sections that undergo tensile deformation. Therefore, even when the aforesaid sections of the rigidity-producing portion 56*c* are subjected to the pressing forces from the balls 53, they can control the deformation magnitude small. That is, the aforesaid sections of the rigidity-producing portion 56*c* can demonstrate sufficient rigidity for inhibiting the movement of the balls 53.

The rigidity-producing portion 56*c* according to the present embodiment in FIG. 11 is less likely to deform compared with Comparative Example Nos. 1-3, because the outer peripheral surface 56*g* possesses a plurality of the shoulders in a stepwise manner so that it is of rigidity. It is allowable that an inclination angle $\alpha$ (FIG. 11) of the inner peripheral surface 56*f* of the rigidity-producing portion 56*c* according to the present embodiment with respect to the axial direction in a direction of heading toward the major-diameter cylindrical portion 56*a* can be set greater than an inclination angle $\beta$ (FIG. 2) of the center line, which connects between a starting point 11*a* of the rigidity-producing portion 11 according to Embodiment No. 1 and a finishing point 11*b* thereof, with respect to the axial direction in a direction of heading toward the major-diameter cylindrical portion 21. Thus, when the joint angle becomes a predetermined value or more, the rigidity-producing portion 56*c* hardly deforms greatly, and thereby the balls become likely to come in contact with the inner peripheral surface 56*f* of the rigidity-producing portion 56*c*.

Moreover, in the present embodiment, the rigidity-producing portion is adapted into the rigidity-producing portion 56*c* that possesses the taper-shaped inner peripheral surface 56*f* and the outer peripheral surface 56*g* possessing a plurality of the shoulders in a stepwise manner. Accordingly, the rigidity-producing portion 56*c* is less likely to deform, compared with the case where a part, which is the same as the rigidity-producing portion 56*c* in a boot with the same size, is formed as a bellows shape, bowl shape or cylindrical shape with the same volume. Even if it deforms, the deformation magnitude is less when applying an identical load. Consequently, the balls 53 are less likely to move so that they are less likely to interfere with the boot 56. Suppose if the boot 56 should have deformed so that the balls 53 move, the balls 53 are brought into contact with the inner peripheral surface 56*f* of the tapered portion 56*p*, and thereby it is possible to keep the balls 53 from moving more outward beyond its tangent plane "Xa."

Moreover, by means of using the boot 56 according to the present embodiment, it is possible to suppress the enlargement of the axial length of the boot 56 itself, and additionally it is possible to suppress the enlargement of the wall thickness, as described above. Further, it is possible to prevent the balls 53 from coming off from the outer race 51, without ever using any new component part, such as metallic fitting, other than the boot 56.

Note that, as illustrated in FIG. 14, when a part that corresponds to the rigidity-producing portion is made so that not only the inner peripheral surface 56*f* but also the outer peripheral surface 56*g* are adapted into the tapered portion 56*p*, a linear tape red configuration, there is such a fear that the rigidity of the tapered portion 56*p*, which corresponds to the rigidity-producing portion, might degrade, compared with the rigidity-producing portion 56*c* in which only the inner peripheral surface 56*f* is adapted into a linear tapered configuration and the outer peripheral surface 56*g* possesses a plurality of the step-shaped shoulders as shown in FIG. 11. However, the contacting areas at the contacting sections between the balls 53 and the tapered portion 56*p* become larger in the course of the balls 53 coming in contact with the tapered portion 56*p* because of the fact that the tapered portion 56*p* undergoes bending deformation, and thereby it is possible to reduce the surface pressures that the tapered portion 56*p* receives from the balls 53. Thus, even in the case where a part of the rigidity-producing portion is adapted into the tapered port ion 56*p* in which not only the inner peripheral surface 56*f* but also the outer peripheral surface 56*g* possess a tapered configuration, it is possible to possess the same constructions as those of said Embodiment No. 3.

Specifically, a cross-grooved constant-velocity universal joint that is provided with the boot illustrated in FIG. 14 is a cross-grooved constant-velocity universal joint, which is provided with: an outer race comprising a cup shape, the outer race with a plurality of outer-race ball grooves being formed in the inner peripheral surface, outer-race ball grooves which twist with respect to an outer-race rotary shaft and one of whose opposite ends is opened to the opening end; an inner face being put in place on the inner side of said outer race slidably in the direction of said outer-race rotary shaft with respect to said outer race, the inner race with a plurality of inner-race ball grooves being formed in the outer peripheral surface and in a direction twisting with respect to an inner-race rotary shaft; a plurality of balls locking peripherally with respect to said outer-race ball grooves and said inner-race ball grooves so as to be put in place rollably, and being put in place at intersections between said outer-race ball grooves and said inner-race ball grooves that cross with respect to said outer-race ball grooves; a retainer being put in place between said outer race and said inner race, the retailer with a plurality of windows being formed, windows into which said balls are inserted respectively; and said flexible boot, which covers and caps between the opening end of said outer race and a shaft that is inserted into said inner race coaxially therewith. Said boot is provided with: said major-diameter cylindrical portion being fixed by fastening onto the outer peripheral surface of the opening end of said outer race; said minor-diameter cylindrical portion being fixed by fastening onto said shaft; a tapered portion being connected integrally with a side of said major-diameter cylindrical portion facing said minor-diameter cylindrical portion and reducing diametrically toward said minor-diameter cylindrical portion; and a stretchable bellows portion being disposed integrally between a minor-diameter side of the tapered portion and said minor-diameter cylindrical portion. When the central axis of said outer race and the central axis of said shaft take an angle of a predetermined value or more, said balls lock peripherally with respect to said outer-race ball grooves, and come in contact with the inner peripheral surface of said boot's said tapered portion. The tapered configuration of the tapered portion's inner peripheral surface in this instance is not limited to the case where it is the linear shape shown in FIG. 14, but it is allowable that it can even be either a curved shape or a stepped shape. The tapered configuration of the tapered portion's outer peripheral surface is not limited to the case where it is the linear shape shown in FIG. 14, but it is allowable that it can even be a curved shape.

In accordance with such constructions, when an inclination angle (joint angle) between the central axis of the outer race and the central axis of the shaft becomes the maximum angle at the time of torque transmission by way of the balls or more, namely, when it becomes an angle of a predetermined value or more, the balls that try to separate from the outer-race ball grooves come in contact with the inner peripheral surface of the boot's tapered portion. Accordingly, the movement of the balls is controlled. That is, the balls do not separate from the outer-race ball grooves by means of the boot's tapered portion. Therefore, it is possible to prevent the bails from coming off from the outer race.

It is allowable that a tangent plane of said balls at the aforesaid coming-in-contact position, and an extension line of the bottom of the inner-race ball grooves can cross one another more outward to said outer race beyond the opening end of said outer race, in the course of said balls coming in contact with the inner peripheral surface of said tapered portion of said boot. In this case, a wedge effect is demonstrated by means of the tapered portion and the inner-race ball grooves, and thereby it is possible to keep the balls from moving outward to the outer race securely. It is allowable that the tangent plane of said balls at said coming-in-contact position can be a tangent plane that is at the furthermost position away from the cupped bottom of said outer race, furthermost position which is one of the coming-in-contact positions of said balls. Thus, it is possible to demonstrate the wedge effect securely.

It is allowable that said tapered portion can be capable of undergoing bending deformation. Thus, the rigidity of the tapered portion becomes lower. And, because of the fact that the tapered portion undergoes bending deformation, the contacting sections between the balls and the tapered portion turn into a planar shape in the course of the balls coming in contact with the tapered portion. Therefore, it is possible to reduce the surface pressures that the tapered portion receives from the balls.

The invention claimed is:

1. A boot for a constant-velocity universal joint, the boot comprising:
a major-diameter cylindrical portion;
a minor-diameter cylindrical portion, separated from and concentric with the major-diameter cylinder portion, and having a smaller diameter than that of the major-diameter cylindrical portion; and
an intermediate portion connecting the major-diameter cylindrical portion with the minor-diameter cylindrical portion, wherein said intermediate portion comprises:
a stretchable bellows portion connected with said minor-diameter cylindrical portion integrally; and
a rigidity-producing portion connected with the bellows portion and said major-diameter cylindrical portion integrally, wherein the rigidity-producing portion enlarges diametrically from said bellows portion toward said major-diameter cylindrical portion, and wherein a wall thickness of said boot at said rigidity-producing portion is enlarged as compared to a wall thickness of said boot at the bellows portion, whereby at least an outer peripheral surface of said rigidity-producing portion has a plurality of shoulders in a stepwise manner resulting from the enlarged wall thickness,
wherein at least one of said shoulders comprises alternately repeated crests protruding in the diametrically outward direction of said shoulders, and roots denting in the diametrically inward direction of said shoulders, and said shoulders have a side surface that connects between said root and said crest in the substantially axial direction of said shoulders, and an end surface that connects between said crest and said root in the substantially diametrical direction, wherein the enlarged wall thickness is not provided at said root.

2. The boot for constant-velocity universal joint as set forth in claim 1, wherein a ratio (B/A), a ratio of a diametrical length (B) of said end surface of said shoulders with respect to a diametrical thickness (A) of said side surface thereof, is 0.5-2.0.

3. The boot for constant-velocity universal joint as set forth in claim 1, wherein a ratio (P/Q), a ratio of an axial length (P) of said rigidity-producing portion with respect to an axial length (Q) of said bellows portion, is 0.3-2.0.

4. The boot for constant-velocity universal joint as set forth in claim 1, further comprising a dent in a connector portion that is connected with said rigidity-producing portion in said bellows portion, wherein said dent dents in a diametrically inward direction such that an axial cross section of the dent a letter-"U" configuration.

5. A boot for a constant-velocity universal joint, the boot comprising:
a major-diameter cylindrical portion;
a minor-diameter cylindrical portion, separated from and being concentric with the major-diameter cylinder portion, and having a smaller diameter than that of the major-diameter cylindrical portion; and
an intermediate portion connecting the major-diameter cylindrical portion with the minor-diameter cylindrical portion, wherein said intermediate portion comprises:
a stretchable bellows portion connected with said minor-diameter cylindrical portion integrally; and
a rigidity-producing portion connected with the bellows portion and said major-diameter cylindrical portion integrally, wherein the rigidity-producing portion enlarges diametrically from said bellows portion toward said major-diameter cylindrical portion, and at least an outer peripheral surface of said rigidity-producing portion has a plurality of shoulders in a stepwise manner,
wherein an inner peripheral surface of said rigidity-producing portion possesses shoulders whose level difference is smaller than a level difference of said shoulders that are formed on the outer peripheral surface of said rigidity-producing portion.

6. A cross-grooved constant-velocity universal joint being provided with a flexible boot comprising a major-diameter cylindrical portion; a minor-diameter cylindrical portion, separated from and concentric with the major-diameter cylinder portion, and having a smaller diameter than that of the major-diameter cylindrical portion; an intermediate portion connecting the major-diameter cylindrical portion with the minor-diameter cylindrical portion, wherein said intermediate portion comprises a stretchable bellows portion connected with said minor-diameter cylindrical portion integrally; and a rigidity-producing portion connected with the bellows portion and said major-diameter cylindrical portion integrally, wherein the rigidity-producing portion enlarges diametrically from said bellows portion toward said major-diameter cylindrical portion, and whereby at least an outer peripheral surface of said rigidity-producing portion has a plurality of shoulders in a stepwise manner, and wherein a wall thickness of said boot at said rigidity-producing portion is enlarged as compared to a wall thickness of said boot at the bellows portion, the cross-grooved constant-velocity universal joint comprising:

an outer race comprising a cup shape, the outer race having a plurality of outer-race ball grooves formed in the inner peripheral surface thereof, wherein the outer-race ball grooves twist with respect to an outer-race rotary shaft and have opposite ends, one of which is opened to the opening end;

an inner race provided at the inner side of said outer race and being slidable with respect to said outer race in the direction of said outer-race rotary shaft, the inner race having a plurality of inner-race ball grooves formed in the outer peripheral surface thereof and in a direction twisting with respect to an inner-race rotary shaft;

a plurality of balls locking peripherally with respect to said outer-race ball grooves and said inner-race ball grooves so as to be put in place rollably, and being put in place at intersections between said outer-race ball grooves and said inner-race ball grooves that cross with respect to said outer-race ball grooves; and a retainer being put in place between said outer race and said inner race, the retainer having a plurality of windows into which said balls are inserted respectively;

wherein said boot covers the opening end of said outer race and a shaft that is inserted into said inner race coaxially therewith; and wherein said major-diameter cylindrical portion of said boot is fixed by fastening onto the outer peripheral surface of the opening end of said outer race, and said minor-diameter cylindrical portion of said boot is fixed by fastening onto said shaft, wherein said balls lock with respect to said outer-race ball grooves peripherally, and come in contact with the inner peripheral surface of said rigidity-producing portion of said boot when the central axis of said outer race and the central axis of said shaft have taken an angle of a predetermined value or more.

7. The cross-grooved constant-velocity universal joint as set forth in claim 6, wherein a tangent plane of said balls at the coming-in-contact position, and an extension line of the bottom of the inner-race ball grooves cross one another more outward to said outer race beyond the opening end of said outer race, in the course of said balls coming in contact with the inner peripheral surface of said rigidity-producing portion of said boot.

8. The cross-grooved constant-velocity universal joint as set forth in claim 7, wherein the tangent plane of said balls at said coming-in-contact position is at the furthermost position away from the cupped bottom of said outer race, the furthermost position being one of the coming-in-contact positions of said balls.

9. The cross-grooved constant-velocity universal joint as set forth in claim 6, wherein said inner peripheral surface of said rigidity-producing portion is a tapered shape which enlarges diametrically toward said major-diameter cylindrical portion.

10. The cross-grooved constant-velocity universal joint as set forth in claim 9, wherein said tapered configuration of said inner peripheral surface of said rigidity-producing portion is linearly-tapered.

* * * * *